United States Patent
Massa et al.

(10) Patent No.: US 9,122,789 B1
(45) Date of Patent: Sep. 1, 2015

(54) SYSTEM AND METHOD FOR TESTING APPLICATIONS WITH A LOAD TESTER AND TESTING TRANSLATOR

(75) Inventors: James Massa, West New York, NJ (US); Andrey N. Kravtsov, West Orange, NJ (US); Ariel Pérez, Jersey City, NJ (US); Edgardo S. Carlos, Livingston, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 1223 days.

(21) Appl. No.: 12/428,994

(22) Filed: Apr. 23, 2009

Related U.S. Application Data

(60) Provisional application No. 61/117,443, filed on Nov. 24, 2008.

(51) Int. Cl.
G06F 11/36 (2006.01)
G06F 9/30 (2006.01)
G06F 15/16 (2006.01)

(52) U.S. Cl.
CPC .......... *G06F 11/3612* (2013.01); *G06F 9/3017* (2013.01)

(58) Field of Classification Search
CPC ............................ G06F 11/3612; G06F 9/3017
See application file for complete search history.

(56) References Cited

U.S. PATENT DOCUMENTS

| | | | |
|---|---|---|---|
| 5,657,438 A | 8/1997 | Wygodny et al. | |
| 5,715,373 A | 2/1998 | Desgrousilliers et al. | |
| 5,812,780 A | 9/1998 | Chen et al. | |
| 5,889,955 A | 3/1999 | Shinozaki et al. | |
| 5,974,572 A | 10/1999 | Weinberg et al. | |
| 6,226,788 B1 | 5/2001 | Schoening et al. | |
| 6,549,944 B1 | 4/2003 | Weinberg et al. | |
| 6,601,020 B1 | 7/2003 | Myers | |
| 6,697,964 B1 | 2/2004 | Dodrill et al. | |
| 7,133,805 B1 | 11/2006 | Dankenbring et al. | |
| 7,231,606 B2 | 6/2007 | Miller et al. | |
| 2006/0276997 A1* | 12/2006 | Drees | 702/182 |
| 2007/0266148 A1* | 11/2007 | Ruiz et al. | 709/224 |
| 2008/0189322 A1* | 8/2008 | Stark et al. | 707/102 |
| 2010/0042970 A1* | 2/2010 | Gibbs | 717/106 |

* cited by examiner

*Primary Examiner* — Suraj Joshi
(74) *Attorney, Agent, or Firm* — Goodwin Procter LLP

(57) ABSTRACT

According to one embodiment, the invention comprise a Translation Tool, that translates messages in a client/server system into a form compatible with a Load Testing Tool, which are used to create a script for the Load Testing Tool. The Load Testing Tool utilizes the script created with the messages converted by the Translation Tool to generate emulated messages to test and evaluate the performance of the client/server system. The Translation Tool (possibly the same as the first translator) translates the messages generated by the Load Testing Tool into a form compatible by the client/server system.

17 Claims, 22 Drawing Sheets

SYSTEM 1

SYSTEM 1

Translator Tool 200

SYSTEM 2

SECURITIES TRADING SYSTEM 3

SYSTEM 4

PARAMETERIZED TRANSACTION PLAYER 2300

SYSTEM AND METHOD FOR TESTING APPLICATIONS WITH A LOAD TESTER AND TESTING TRANSLATOR

CROSS-REFERENCE TO RELATED APPLICATIONS

This Application is a utility application claiming priority under 35 U.S.C. 119(e) to provisional utility application 61/117,443, filed on Nov. 24, 2008.

FIELD OF THE INVENTION

The present invention relates, generally, to a system and method for load testing a device or application, and more specifically, to a translator for use in load testing a device or application.

BACKGROUND OF THE INVENTION

Load testing, generally, is used to put demands on a system, device, application or combination thereof, and measure the response. Load testing has numerous uses, including: demonstrating that a system meets performance criteria, comparing two systems to determine which performs better, and measuring the components of the system or workload on the system that cause the system to perform poorly. Load testing, as described above, is useful for testing the performance of software applications, databases, networks, client side processing, load balancing utilities, and other systems and programs.

In software, and more particularly, software applications utilized over a network, load testing may refer to the practice of modeling the usage of a software application by simulating multiple users accessing the program concurrently. As such, testing is relevant for multi-user systems, often systems built according to a client/server model, such as web servers. However, other types of software systems may also be load tested. For example, a word processor or graphics editor can be forced to read an extremely large document; or a financial software package can be forced to generate a report based on several years' worth of data.

When the load placed on a system is raised beyond normal usage patterns in order to test a system's response at unusually high or peak loads, this technique is known as stress testing.

Some load testers operate based on a "script" of the test to be performed. That is, the script of the workload of the system is run by the load tester. For example, a script may consist of a series of Database requests. As long as a user is able to edit the script, the user is capable of creating and altering conditions for testing. Such modifications may include parameterization (selecting data for keyword-driven testing), correlation, and error handling. One benefit of a script is easy modification to alter the conditions of the load on the system.

Although models can be useful, the most useful load testing assessment is based on actual, rather than theoretical, loads. It is often crucial for the test conditions to be similar to the expected actual use. However, it can be difficult to simulate or predict the actual conditions of operation because the workload of a system has random characteristics. While models attempt to mimic what may happen in the system, it is impossible to exactly replicate this workload variability.

Accordingly, in order to better simulate actual operating conditions, the above mentioned scripts may be created by "recording" the system to be tested during normal operation. That is, during a "recording phase" a system is operated normally so that, for example a client application issues requests to a backend server, which sends responses, and those requests and responses are "recorded" to create a script. The recorded script is then "played back" by the load tester to test and evaluate the performance of the system. One example of such a tester is LoadRunner®, which is commercially available from Hewlett-Packard, Corp.

A drawback to load testing and performance products available on the market (i.e., so-called "off-the-shelf" products) is that they are typically limited to particular message formats. For example, an application to be tested may send out messages in format X, but the load tester may only accept a script in format A. Thus, if the application messages (which may be in the form of requests and responses) are recorded in format X, then the load tester cannot support the script and test the application.

If the software testing laboratory is testing multiple applications having different message formats X, Y, Z, etc., and the load tester can only operate with one format A then the problem is magnified.

If the software testing laboratory uses multiple load testers working in formats A, B, C, etc., then the problem may be exacerbated even further.

Another problem arises when the format of the load tester is not comprehendible by a user, such that a User may edit the script to, for example, alter the conditions of load testing.

It should be readily apparent to those having ordinary skill in the art that other problems and drawbacks also may also exist.

BRIEF SUMMARY OF THE INVENTION

In accordance with an exemplary embodiment of the present invention, there is provided a method of conducting a load test on a system with a translation tool, the method implemented on a computer comprising a memory and a processor. According to this exemplary embodiment the method includes the steps: forwarding a message in a first format incompatible with a load testing tool to a server on the system, and converting the message in the first format incompatible with the load testing tool to a second format compatible with the load testing tool. Furthermore, the processor executes conversion instructions stored in the memory for converting the message.

In accordance with another exemplary embodiment of the present invention, there is provided a method of load testing a device in a system, the method implemented on a computer comprising a memory and a processor. According to this exemplary embodiment the processor generates a script based on a library of messages, and generates a load for a device. The load is in a format incompatible with the device in the system; transmitting the load to a translation tool.

In accordance with another exemplary embodiment, there is provided a system for remotely load testing a server that is operable to receive messages from a client computer, wherein the messages are in a first format incompatible with a load testing tool. According to this exemplary embodiment, the system includes a translator tool, comprising a processor and a memory, and operable to convert messages in the first format incompatible with the load testing tool to a second format compatible with the load testing tool. The processor executes conversion instructions stored in the memory for converting the message. The load testing tool is operable to generate a load in the second format to test the server, where the second format is incompatible with the server.

In accordance with another exemplary embodiment, there is provided a translation tool for utilization with a load testing tool that conducts a remote load testing of a remote computing device. According to this exemplary embodiment, the translation tool includes a plurality connectors, wherein the plurality of connectors communicably connects to a plurality transport protocols. The translation tool also includes a filter engine, wherein the filter engine filters messages based on a type of transaction. Finally, the Translation tool includes a transformation engine, wherein the transformation engine converts messages from a first format to a second format.

Other variations and substitutions exist and will be understood to exist by one of ordinary skill in the art.

DETAILED DESCRIPTIONS OF EXEMPLARY EMBODIMENTS

An exemplary embodiment of the present invention will now be described in relation to FIG. 1. The following description is meant only to be an example, and it should be readily apparent to one of ordinary skill in the art that the full scope of the invention encompasses many possible variations and modifications to the exemplary embodiments.

Figure 1:
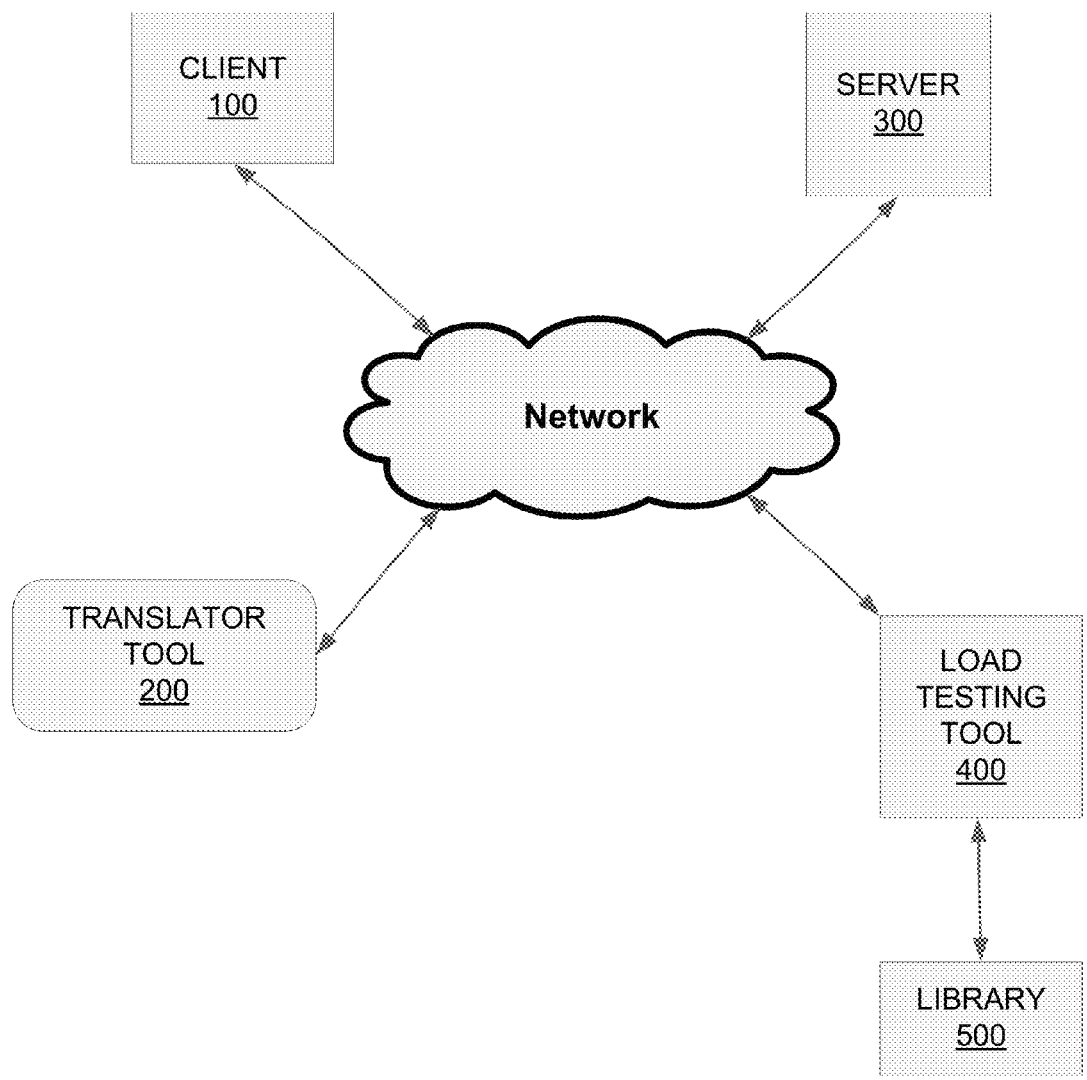
FIG. 1 is a block diagram illustrating an exemplary embodiment of the present invention.

The system 1 of FIG. 1 includes a Client 100, a Translator Tool 200, a Server 300, a Load Testing Tool 400, and a Library 500.

The Client 100 in this example may be an application running on a computer. The Client 100 generates requests and receives responses.

The Server 300, according to this exemplary embodiment, may be an application server that responds to requests from the Client 100. The Server 300 is not limited to an application server, and may also be a web server, a database, or any combination thereof running on one or more separate machines. The Server 300 may be connected to a communications medium for communication with the Client 100. The communication medium may be any type of network, for example the internet, a local network, an ad-hoc network, a cellular network or a combination thereof. The Server 300 generates responses to requests generated by the Client 100 and received over the communications medium.

The load Testing Tool 400 may be a computer that simulates the load generated (such as by the Client 100) on the Server 300. The load Testing Tool 400 is illustrated in FIG. 1 as a single computer simulating a single client. However, the load Testing Tool 400 may simulate many clients if necessary to test the load on the Server 300. For example, the load Testing Tool 400 maybe more than one computer, each simulating the load generated by a client. The load Testing Tool 400 may also be a single computer simulating more than one virtual client, each virtual client simulating the load generated on the Server 300.

While simulating the load on the Server 300 generated by clients, the load Testing Tool 400 receives responses from the Server 300 that are used to analyze the effect of the simulated load on the Server 300. The results of the analysis may be used to optimize the Server 300, specifically, or the system 1, generally. The analysis may be performed at the load Testing Tool 400, or may be performed remotely, for example, by a computer that has access to data stored on the load Testing Tool 400.

In order to simulate the load on the Server 300 generated by clients, the Testing Tool 400 must generate the same types of requests generated by clients, including the Client 100. One way to generate the requests is using a "playback" method. A playback method can be conceptually separated into two phases: (1) a recording phase, and (2) a playback phase.

During the recording phase, a user application on the Client 100 generates requests that the load Testing Tool 400 "records". When the load Testing Tool 400 is finished recording the user requests generated by the user application on the Client 100, the load Testing Tool 400 generates a script based on the recorded requests. The script is capable of directing emulation of a client load on the Server 200 that should be fairly typical of a real load generated by the Client 100. It is desirable for the script to be capable of editing to enhance the load testing.

During the playback phase, the load Testing Tool 400 generates requests to the server 300 based on the script created from the recorded requests by the Client 100. The load Testing Tool 400 may, based on the specific test being performed, generate the requests as if from a single client, or many clients.

The Translator Tool 200 may be disposed between the client 100, the server 300, and the Testing Tool 400s. The Translator Tool 200 "translates" (i.e., converts) messages from one format into another format. The Translator Tool 200 may be a computer, such as a server, but the Translator Tool 200 may also be an application running on the same computer as the Client 100, Server 300, or Testing Tool 400. The Translator Tool 200 translates requests and responses from the Client 100 and Server 300 into a form compatible with the load Testing Tool 400. In addition, the Translator Tool 200 and translates the emulated requests by the Testing Tool 400 into a form compatible with the Server 300.

Figure 2A:
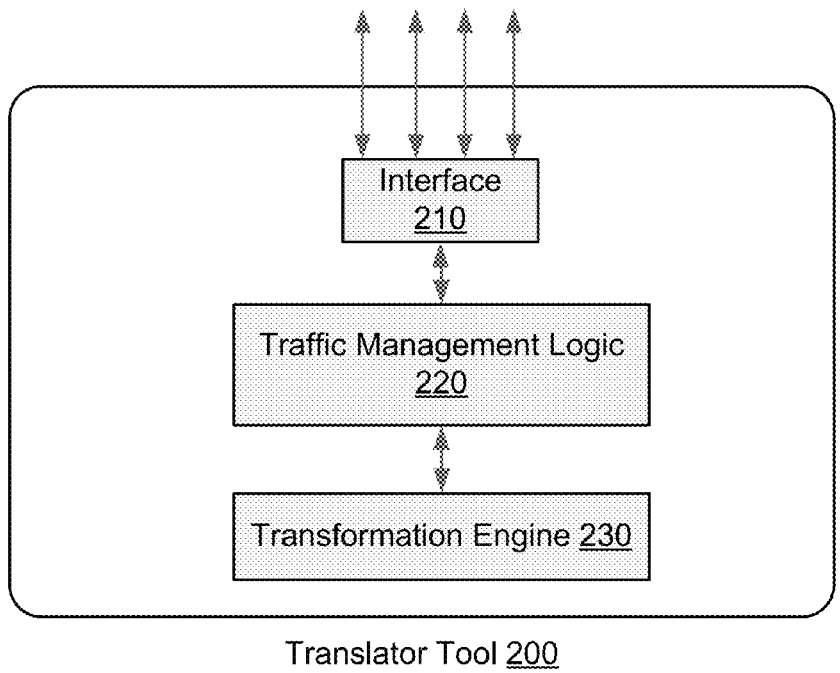
FIG. 2a is a block diagram illustrating an exemplary embodiment of the present invention.

FIG. 2a illustrates the Translator Tool 200 according to an exemplary embodiment. The Translator Tool 200 includes an Interface 210, Traffic Management Logic 220, and a Transformation Engine 230. Messages are received and forwarded (to the Transformation Engine 230 or otherwise) by the Interface 210 via the Management Logic 220. The Transformation Engine 230 converts the received messages between formats.

Figure 2B:
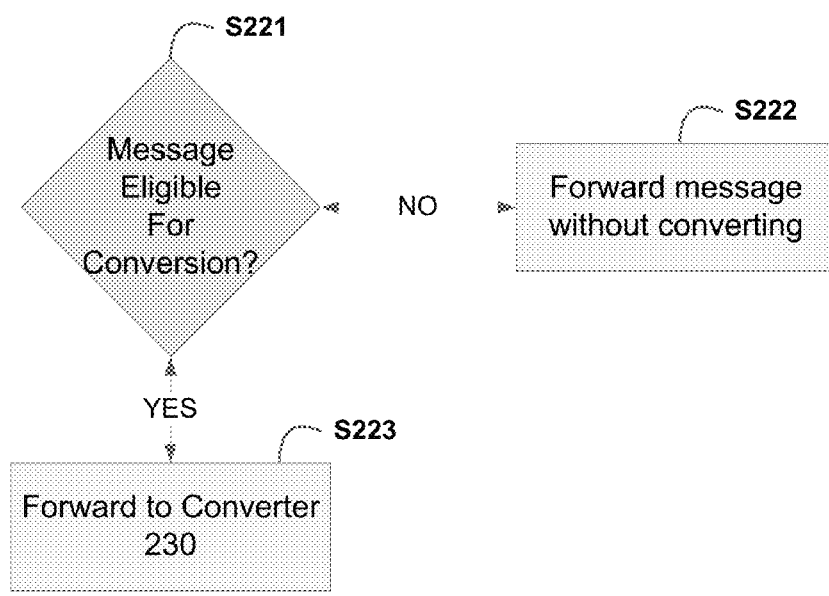
FIG. 2b is a flow diagram illustrating an exemplary embodiment of the present invention.

FIG. 2b illustrates an exemplary operation of the Traffic Management Logic 220. The Traffic Management Logic 220 receives messages from the Interface 210, and determines whether the message requires converting to a different format (S221). If the message requires converting to a different format, then the Traffic Management Logic 220 forwards the message to the Transformation Engine 230. If the message does not require converting to a different format, then the Traffic Management Logic 220 forwards the message back to the Interface 210 to be appropriately forwarded.

An exemplary operation of the Translator Tool 200 will now be described with regard to FIGS. 3-5. Throughout the exemplary operation, there will be references to "formats" of messages, requests and responses. "Format" refers to the manner in which a message is represented. For example, binary code, ASCII code, Unicode, extensible-markup-language (XML), JAVA Object etc.

Figure 3:
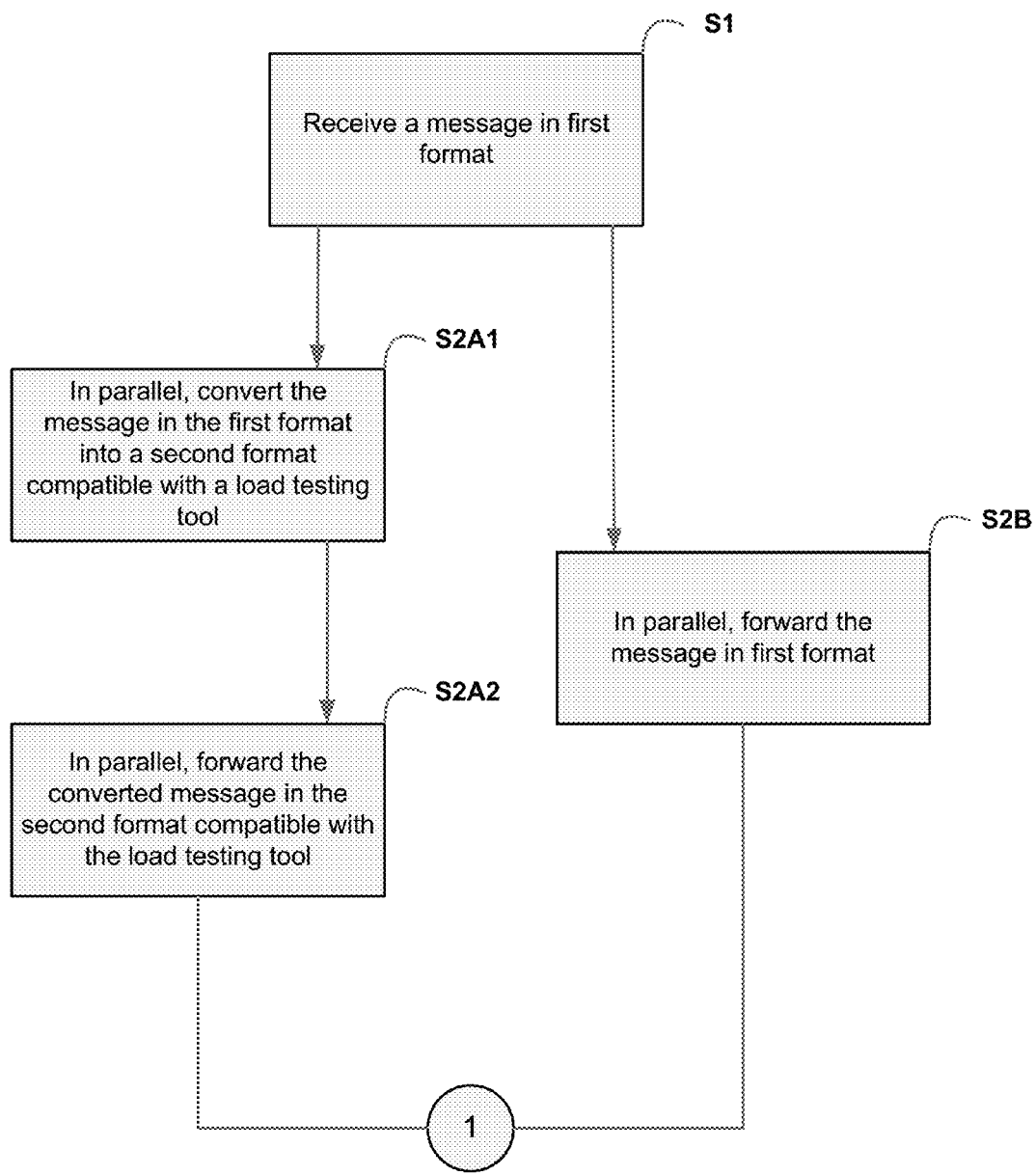
FIG. 3 is a flow chart illustrating an operation according to an exemplary embodiment of the present invention.

Turning to FIG. 3, first, the Translator Tool 200 receives a message in a first format (step S1). The message in the first format may be generated by a client computer, such as client 100 (FIG. 1). After receiving the message in the first format, the Translator Tool 200 performs two operations in parallel. The Translator Tool 100 converts the message in the first format into a second format compatible with the load Testing Tool 400 (step S2A1), and forwards the converted message in the second format compatible with the load Testing Tool 400 (step S2A2) to the Load Testing Tool 400. In parallel to steps S2A1 and S2A2, the Translator Tool 200 forwards the message in the first format (step S2B) to the Server 300. Forwarding the converted message in the second format compatible with the load Testing Tool 400 may include storing the converted message in a Library 500, that is accessible by the Testing Tool 400, but storing in the Library 500 is not required.

Figure 4:
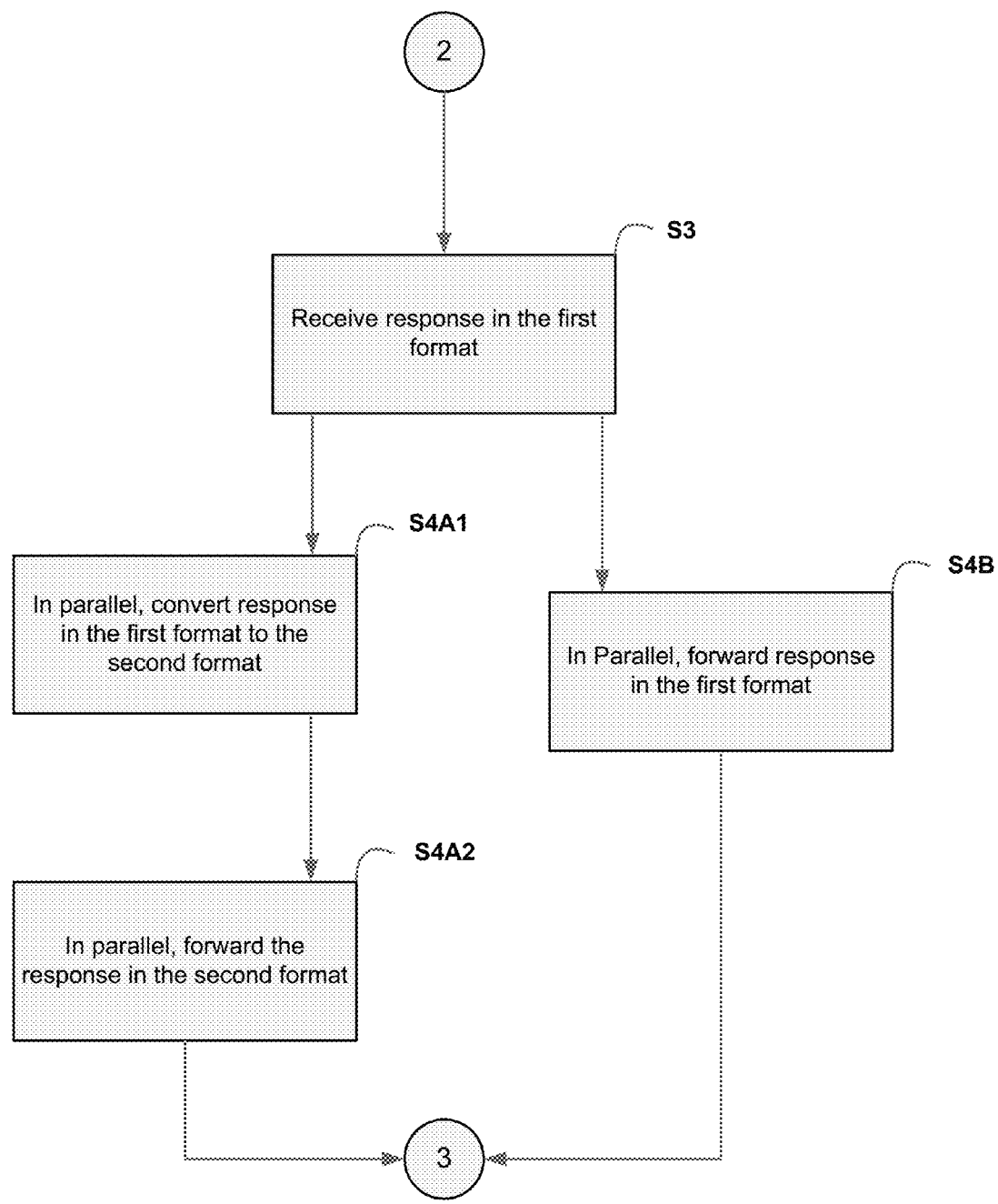
FIG. 4 is a flow chart illustrating an operation according to an exemplary embodiment of the present invention.

Turning to FIG. 4, the Translator Tool 200 receives a response message in the first format (step S3) from the Server 300, and forwards the response in the first format (step S4B) to the Client 100. In parallel, the Translator Tool 200 converts the response in the first format to the second format (step S4A1), and forwards the converted response in the second format (step S4A2) to the Testing Tool 400.

Figure 5:
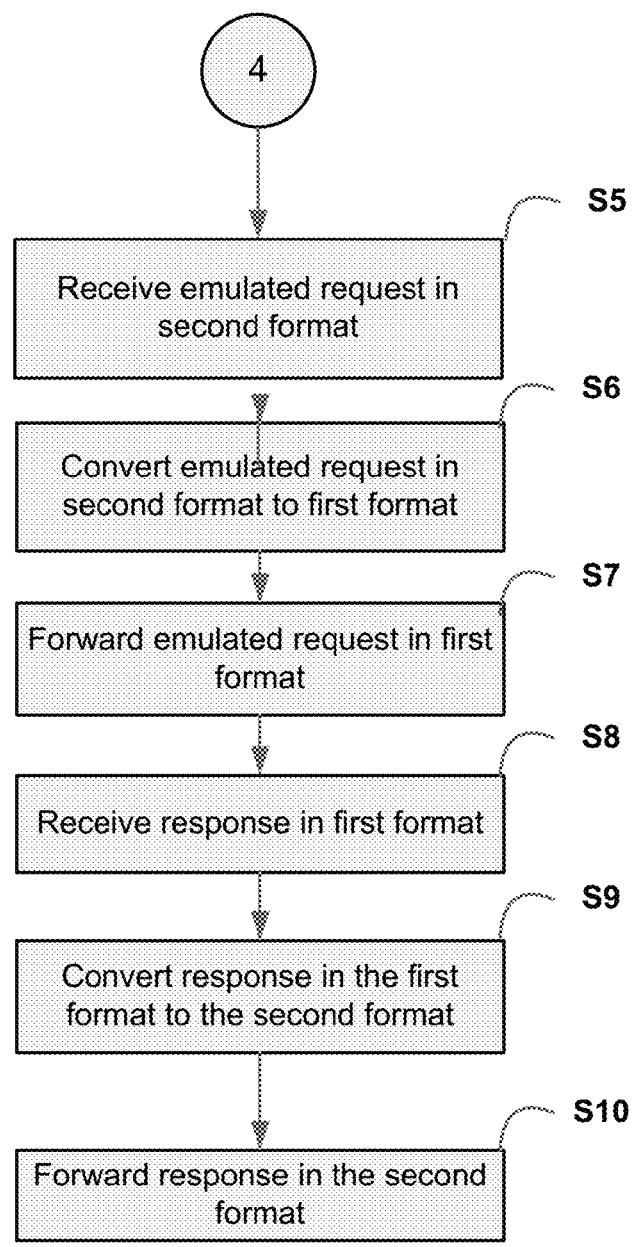
FIG. 5 is a flow chart illustrating an operation according to an exemplary embodiment of the present invention.

Turning to FIG. 5, the Translator Tool 200 receives an emulated request in the second format (step S5) from the Testing Tool 400. The Translator Tool 200 converts the emulated request in the second format into the first format (step S6), and forwards the converted emulated request in the first format (step S7) to the Server 300. The Translator Tool 200 receives the response from the Server 300 (step S8). The Translator Tool 200 converts the response in the first format into the second format (step S9), and forwards the response in the second format (step S10) to the Testing Tool 400.

Figure 6:
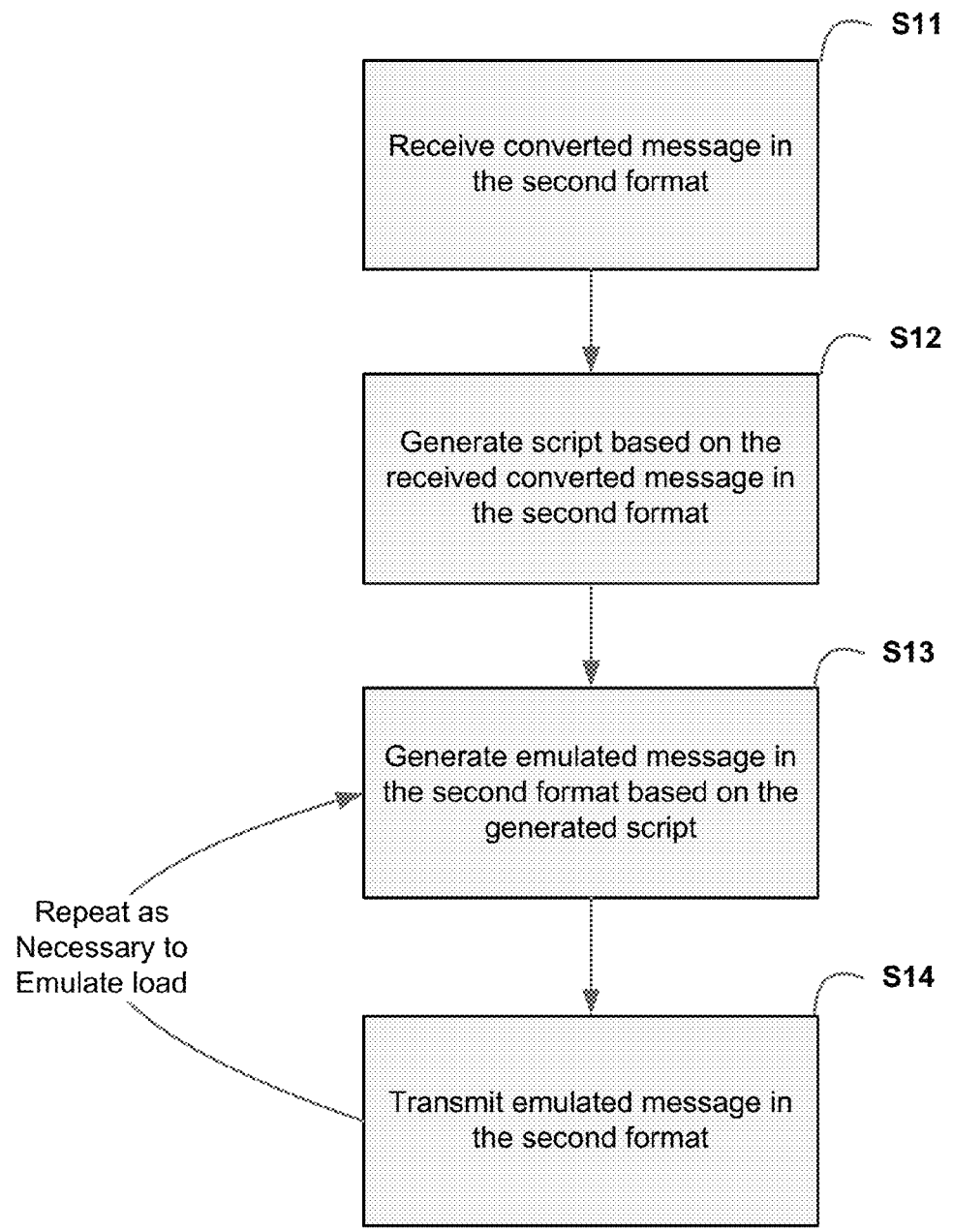
FIG. 6 is a flow chart illustrating an operation according to an exemplary embodiment of the present invention.

An exemplary operation of the Testing Tool 400 will now be described with relation to FIG. 6. First, the Testing Tool receives a converted message in the second format (step S10). The converted message in the second format was converted by the Translator Tool 200 in step S2A1 (FIG. 3). Next, the Testing Tool 400 generates a script based on the received converted message in the second format (step S11). As explained above, the script is for simulating load, for example on a server. The Testing Tool 400 may generate the script based on received converted messages stored in the Library 500. Next, the Testing Tool 400 generates an emulated message in the second format based on the generated script (step S12), and transmits the emulated message in the second format (step S13) to the Translator Tool 200. Steps S12 & S13 may be repeated as many times as necessary to emulate the load on the server 300.

According to the general method described above, the Load Testing Tool 400 is operable to send many requests messages, receive responses, and evaluate the overall performance of the system. The Load Testing Tool 400 according to the exemplary embodiment is able to evaluate performance even though the Client 100 and the Server 300 send messages in a first format whereas the Load Testing Tool 400 is only capable of evaluating applications sending messages in a second (different) format.

Figure 7:
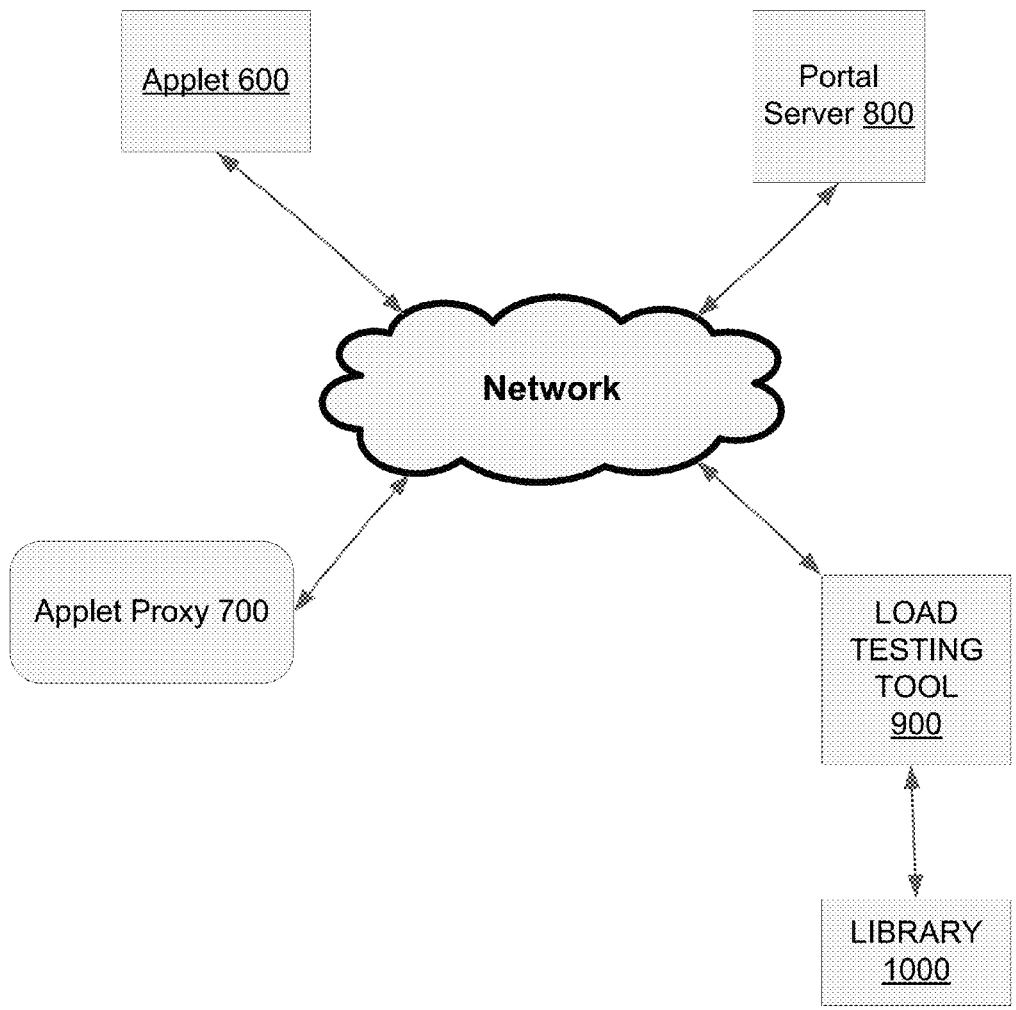
FIG. 7 is a block diagram illustrating an exemplary embodiment of the present invention.

A system 2 according to another exemplary embodiment of the present invention is illustrated in FIG. 7. In this exemplary embodiment, the system 2 includes an Applet 600, an Applet Proxy 700, a Portal Server 800, a Library 1000 and a load Testing Tool 900. The Applet 600 runs in an Internet browser preferably on a computer. The Applet 600 may, for example, be a JAVA® Applet. The Portal Server 800 may be, for example, a Sun JAVA® System Portal Server. The load Testing Tool 400 operates as described above. In addition, the load Testing Tool according to this exemplary embodiment utilizes requests in XML format. XML stands for "extensible mark-up language", and XML is often used on the Internet because XML allows the user to define mark-up elements that aid information systems in sharing structured data.

The Applet 600, Applet Proxy 700, Portal Server 800, Library 1000 and load Testing Tool 900 are connected via a communications medium. The communication medium may be any type of network, for example the internet, a local network, an ad-hoc network, a cellular network or a combination thereof.

Although described with reference to the Portal Server, Applet Proxy, Load Testing Tool and Library, the concept disclosed here should not be limited thereto, and one of ordinary skill in the art would understand that different elements and configurations could readily be substituted for the ones described herein. Further, the concept is not intended to be limited to load testing a JAVA® Applet, or any Applet. One of ordinary skill in the art would recognize that the concept disclosed in the system and method described herein is equally applicable to any circumstance where a client application to be tested by a Load Testing Tool receives and transmits a "load" (e.g., messages or other data) in a format that is not compatible with a Load Testing Tool.

An exemplary operation of the Applet Proxy 700 will now be described in relation to FIG. 8-11.

The Applet Proxy 700 receives a DBCommand, serialized as binary, as an HTTP Request (step S101) from the Applet 600. The Applet Proxy 700 forwards the binary DBCommand as an HTTP Request to the Portal Server 800 (step S102B). As the Applet Proxy 700 forwards the binary DBCommand as an HTTP Request to the Portal Server 800, in parallel the Applet Proxy 700 converts the binary DBCommand to XML (step S102A1), and forwards the DBCommand in XML as an HTTP Request to the load Testing Tool 900 (step S102A2). Forwarding the DBCommand in XML as an HTTP Request to the load Testing Tool 900 may include storing the converted message in a Library 1000, that is accessible by the Testing Tool 900, but storing in the Library 1000 is not required.

There are multiple ways that the Applet Proxy 700 may convert the binary DBCommand to XML, for example, serializing the binary DBCommand The Applet Proxy 700 may use any appropriate library to serialize the DBCommand from binary into XML, one exemplary library is XStream®.

Figure 9:
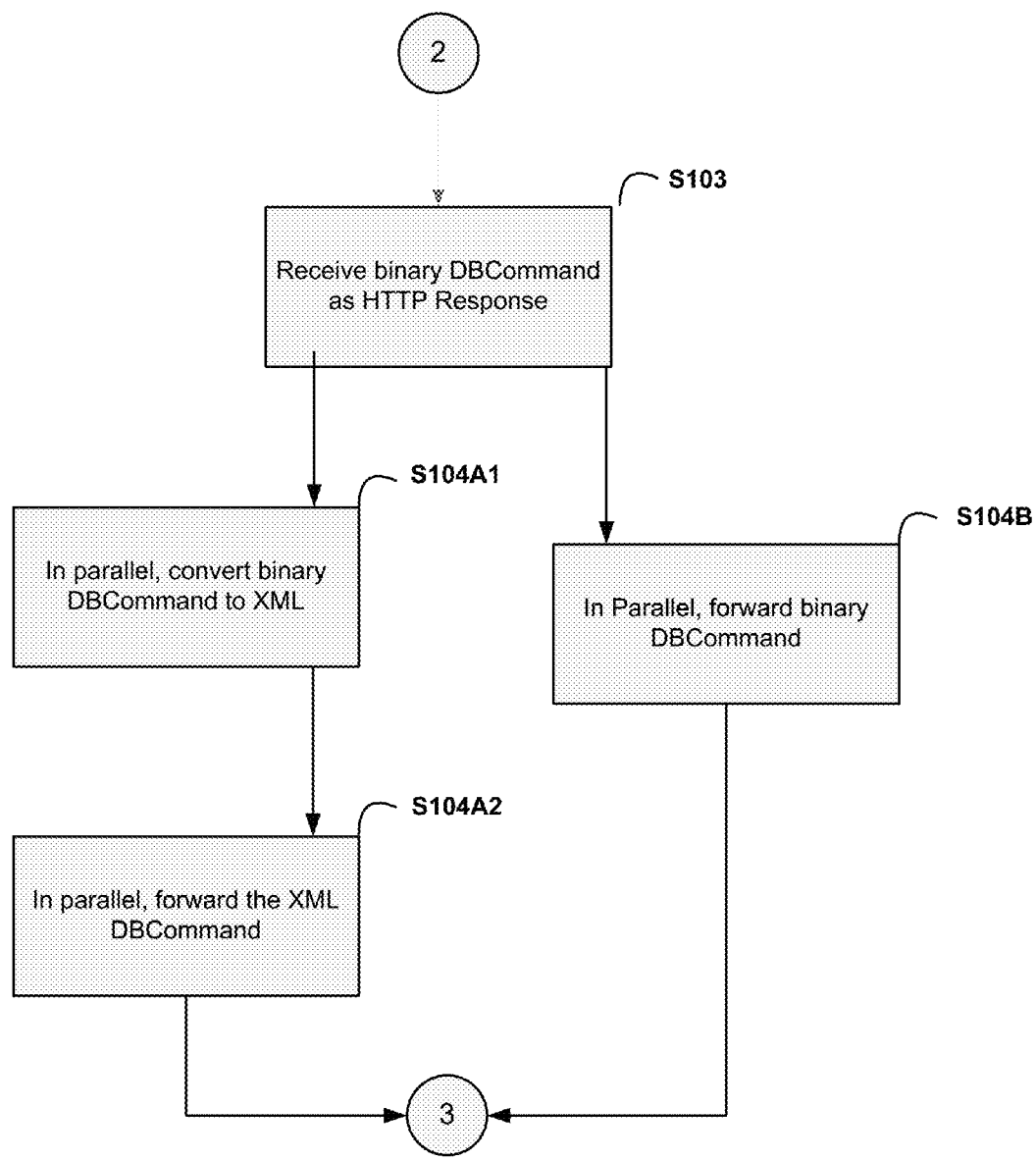
FIG. 9 is a flow chart illustrating an operation according to an exemplary embodiment of the present invention.

Turning to FIG. 9, the Applet Proxy 700 receives a binary DBCommand as an HTTP Response from the Portal Server 800 (step S103). The Applet Proxy 700 forwards the binary DBCommand as an HTTP Response to the Applet 600 (step S104B). As the Applet Proxy 700 forwards the binary DBCommand as an HTTP Response to the Applet 600, in parallel, the Applet Proxy 700 converts the binary DBCommand to XML (step S104A1), and forwards the DBCommand in XML as an HTTP Response to the load Testing Tool 900 (step S104A2).

Figure 8:
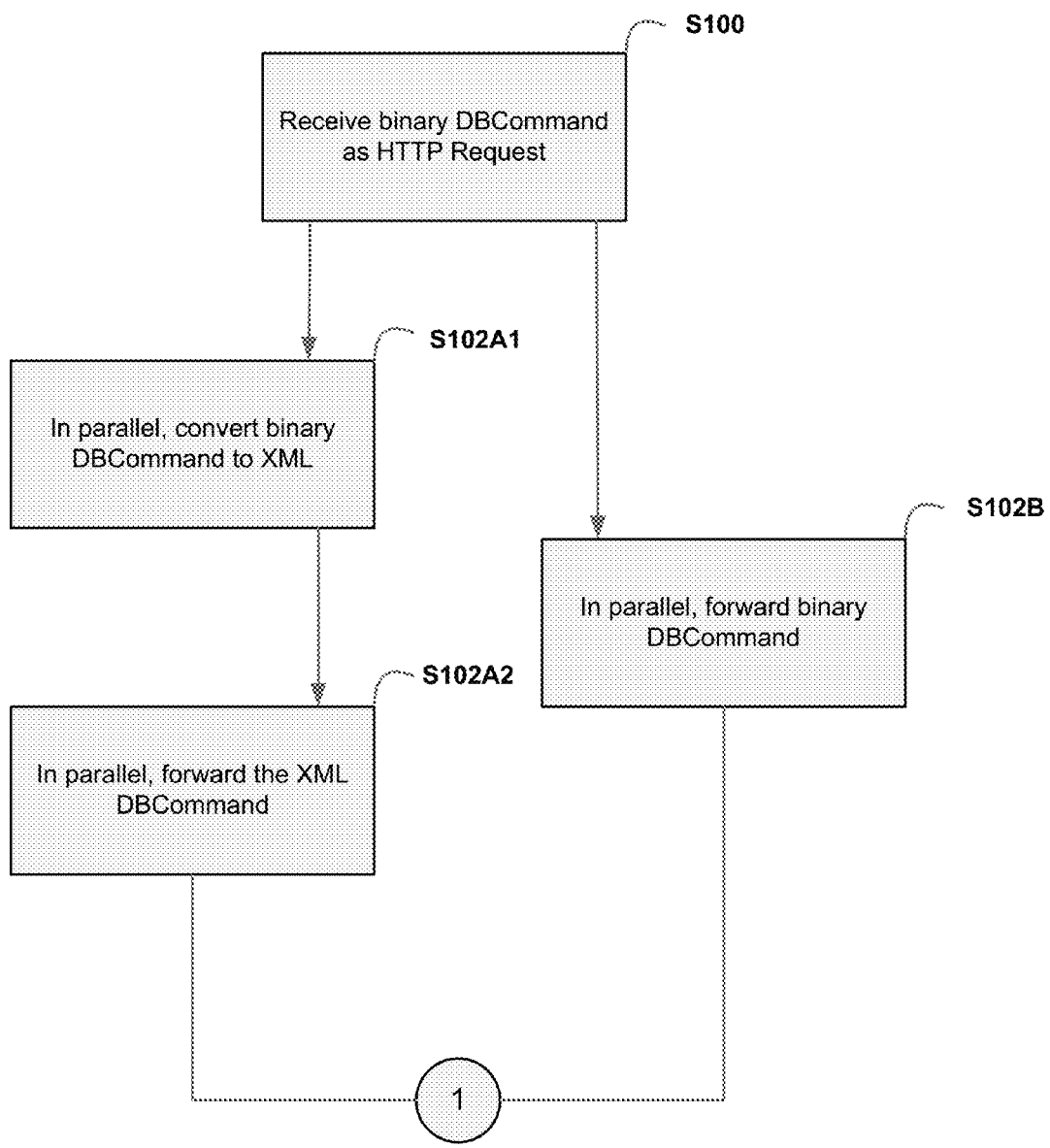
FIG. 8 is a flow chart illustrating an operation according to an exemplary embodiment of the present invention.

The recorded response/request information will be used in script building and playback to stress the system using the load tester. Thus, the operation described in relation to FIG. 8 is part of the so-called "recording phase", of load testing.

Figure 10:
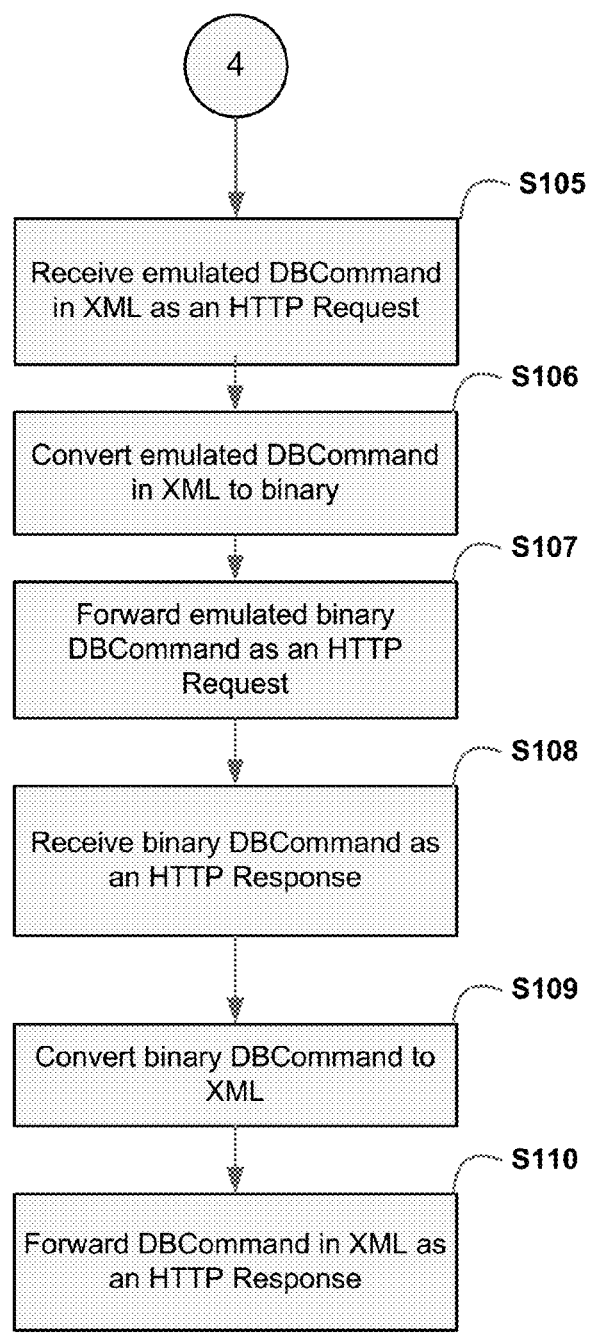
FIG. 10 is a flow chart illustrating an operation according to an exemplary embodiment of the present invention.

A further exemplary operation of the Applet Proxy 700 will now be described in relation to FIG. 10. This exemplary embodiment includes "parameterization." Parameterization refers to the set of parameters changed by a load Testing Tool in order to generate varying messages that creates loads on a device or application in order to achieve load goals. For example, assume there is a load range of 1 to N that the testing tool optimally will put on a device or application. To achieve the range 1 to N, parameter set [a, b, c, d, e] should be varied according to permutations. Thus, the parameter set [a, b, c, d, e] is used by, for example, the Applet Proxy 700, to be used to select the data with which to populate the generated XML messages during a recording phase.

The load Testing Tool 900 parameterizes a DBCommand in XML, possibly stored in the Library 1000, as an HTTP Request and transmits the DBCommand in XML to the Applet Proxy 700 (not shown). As explained above, the DBCommand in XML is the binary DBCommand converted to XML.

The Applet Proxy 700 receives the emulated DBCommand in XML as an HTTP Request (step S105). The Applet Proxy 700 converts the emulated DBCommand in XML to binary (step S106), and forwards the binary emulated DBCommand to the Portal Server 800 as an HTTP Request (step S107). As explained above, there a multiple ways the Applet Proxy 700 may convert the emulated DBCommand in XML to binary, for example, serializing the DBCommand in XML using XStream®.

The Applet Proxy 700 receives a binary DBCommand as an HTTP Response from the Portal Server 800 (step S108). The Applet Proxy 700 converts the binary DBCommand to XML (step S109), and forwards the DBCommand in XML as an HTTP Response to the load Testing Tool 900 (step S110).

Figure 11:
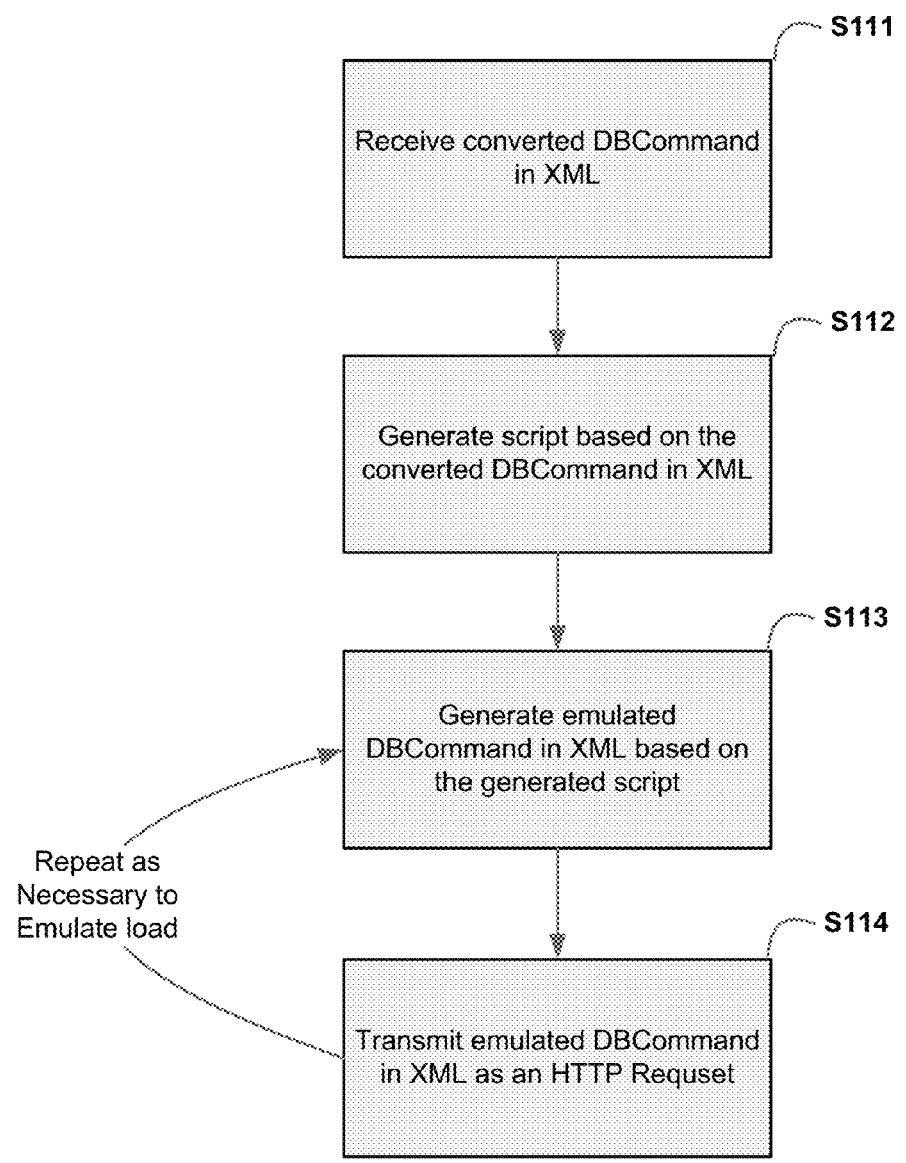
FIG. 11 is a flow chart illustrating an operation according to an exemplary embodiment of the present invention.

An exemplary operation of the Testing Tool 900 will now be described with relation to FIG. 11. First, the Testing Tool 900 receives a converted DBCommand in XML (step S111). The converted DBCommand in XML was converted by the Applet Proxy 700 in step S102A1 (FIG. 3). Next, the Testing Tool 900 generates a script based on the converted DBCommand in XML (step S112). As explained above, the script is for simulating load, for example on a server. The script may be formed based on converted DBCommands stored in the Library 1000. Next, the Testing Tool 900 generates an emulated DBCommand in XML based on the generated script (step S113), and transmits the emulated DBCommand in XML as an HTTP Request to the Applet proxy 700 (step S114). Steps S113 & S114 may be repeated as many times as necessary to emulate the load on the server 300.

According to the general method described above, the load Testing Tool 900 according to the exemplary embodiments is operable to send many requests messages, receive responses, and evaluate the overall performance of the system. The load Testing Tool 900 according to the exemplary embodiment is able to evaluate performance even though the Applet 600 and Portal Server 800 send binary DBCommands whereas the load Testing Tool 900 is only capable of evaluating applications sending messages in XML format.

Figure 12:
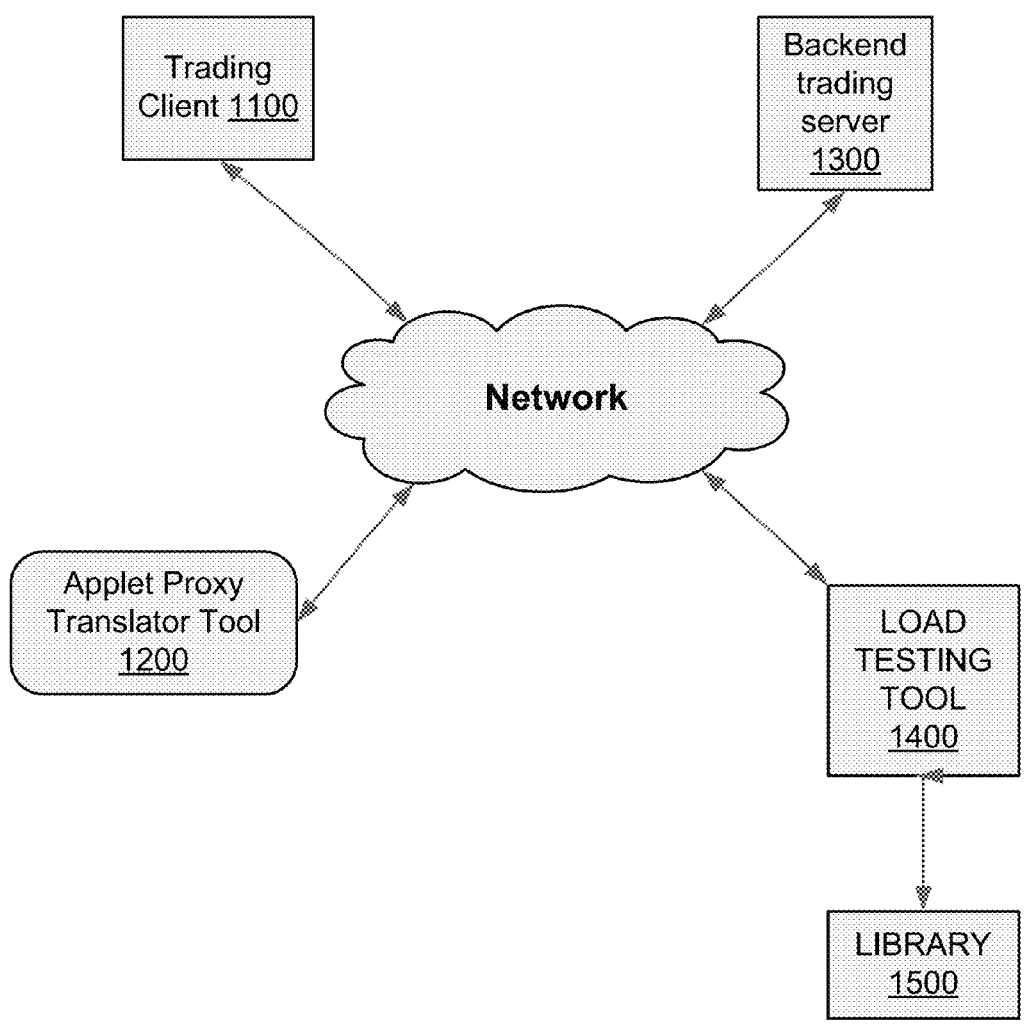
FIG. 12 is a block diagram illustrating an exemplary embodiment of the present invention.

A securities trading system 3 according to an exemplary embodiment of the present invention is illustrated in FIG. 12. The securities trading system 3 according to this exemplary embodiment of may be used to evaluate a trading system (e.g., stocks, securities, etc.). The securities trading system 3 may include, a Trading Client 1100, an Applet Proxy 1200, a Backend Trading Server 1300, a load Testing Tool 1400 and a library 1500.

In this exemplary embodiment, the trading client 1100 is an Applet running in a browser, where the Applet is an application for submitting trade requests to the Backend Trading Server 1300. However, the present invention is no so limited.

An exemplary operation of the securities trading system 3 will now be described in relation to claims 13-15.

Figure 13:
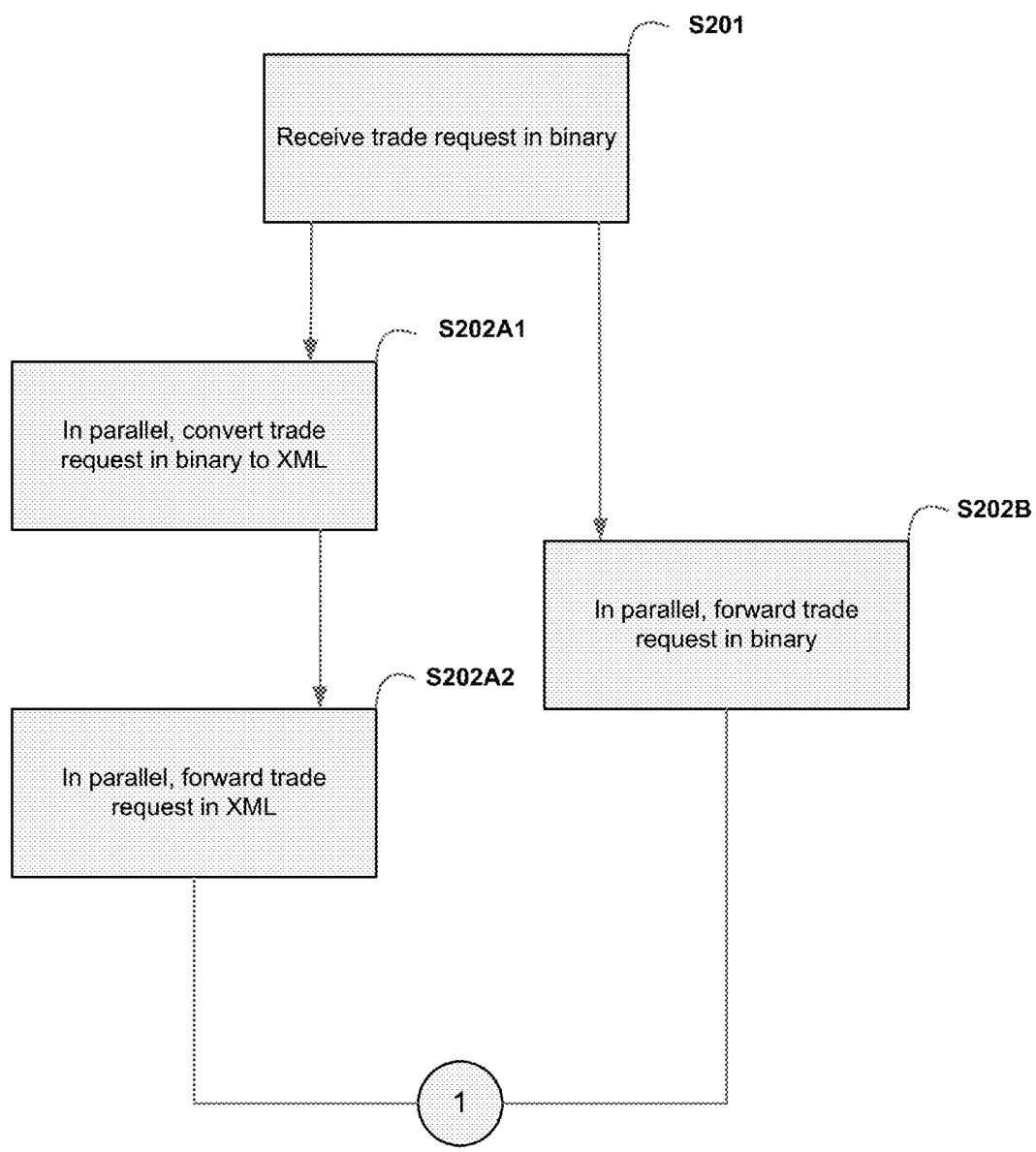
FIG. 13 is a flow chart illustrating an operation according to an exemplary embodiment of the present invention.

Starting with FIG. 13, the Applet Proxy 1200 receives a trade request in the form of a binary DBCommand (step S201) from the Trading Client 1100. The Applet Proxy 700 forwards the trade request to the Backend Trading Server 1300 (step S202B). As the Applet Proxy 1200 forwards the trade request to the Backend Trading Server 1300, in parallel the Applet Proxy 1200 converts the trade request from a binary DBCommand to XML (step S202A1), and forwards the trade request, which is now a DBCommand in XML, to the load Testing Tool 1400 (step S202A2). Forwarding the trade request to the load Testing Tool 1400 may include storing the trade request in the Library 1500, however storing in the Library 1500 is not required.

Figure 14:
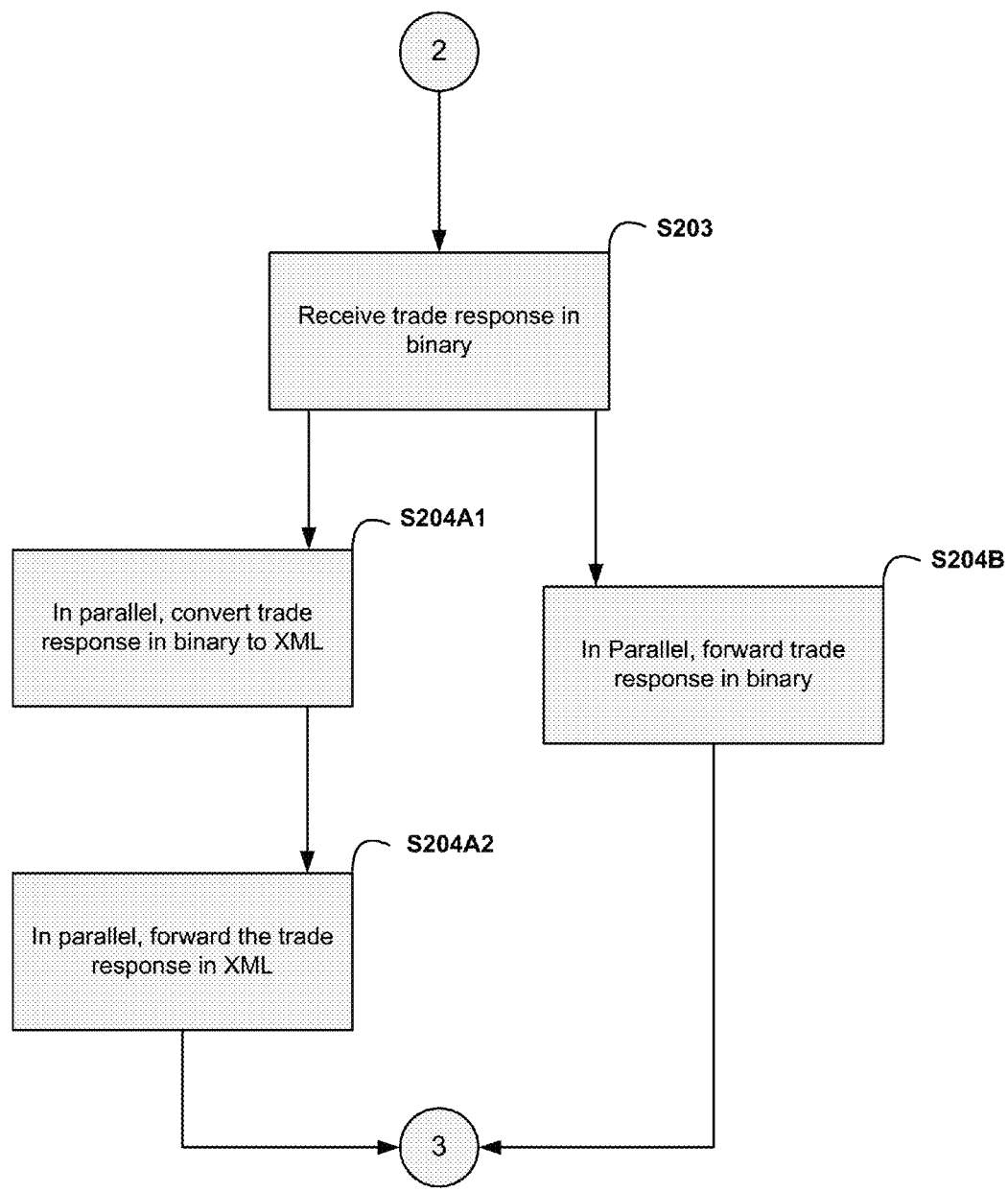
FIG. 14 is a flow chart illustrating an operation according to an exemplary embodiment of the present invention.

Turning to FIG. 14, the Applet Proxy 1200 receives a trade response in the form of a binary DBCommand from the Backend Trading Server 1300 (step S203). The Applet Proxy 1200 forwards the trade response to the Trading Client 1100 (step S204B). As the Applet Proxy 1200 forwards the trade response to the Trading Client 1100, in parallel, the Applet Proxy 1200 converts the trade response, which is a binary DBCommand to XML (step S204A1), and forwards the trade response as a DBCommand in XML to the load Testing Tool 1400 (step S204A2).

The recorded response/request messages will be used in script building and playback to stress the system using the load tester. Thus, the operation described in relation to FIG. 14 is part of the so-called "recording phase", of load testing.

Figure 15:
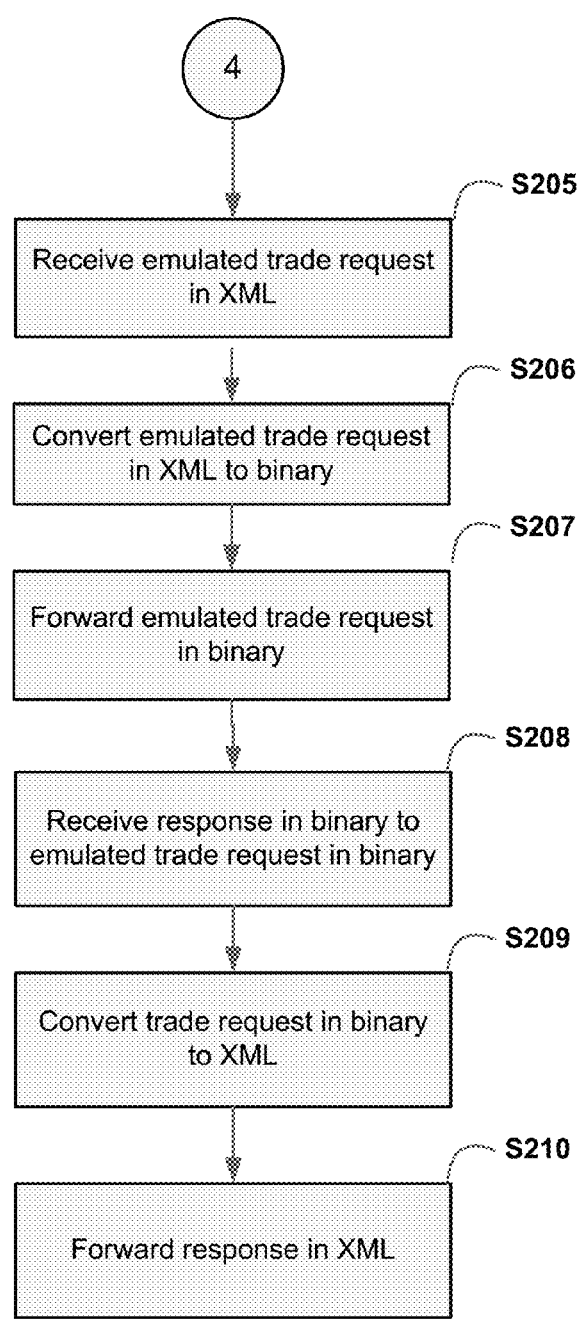
FIG. 15 is a flow chart illustrating an operation according to an exemplary embodiment of the present invention.

A further exemplary operation of the Applet Proxy 1200 will now be described in relation to FIG. 15.

The load Testing Tool 1400 parameterizes a trade request in the form of a DBCommand in XML, possibly stored in the Library 1500 transmits DBCommand in XML to the Applet Proxy 1200 (not shown). As explained above, the DBCommand in XML is the binary DBCommand converted to XML.

The Applet Proxy 1200 receives the emulated trade request (step S205). The Applet Proxy 1200 converts the emulated trade request from XML to a binary DBCommand (step S206), and forwards the emulated trade request in binary to the Backend Trading Server 1300 (step S207). As explained above, there a multiple ways the Applet Proxy 1200 may convert the emulated DBCommand in XML to binary, for example, serializing the DBCommand in XML using XStream®.

The Applet Proxy 1200 receives a trade response in binary from the Backend Trading Server 1300 (step S208). The Applet Proxy 1200 converts the trade response from a binary DBCommand to XML (step S209), and forwards the DBCommand in XML to the load Testing Tool 1400 (step S210).

Figure 16:
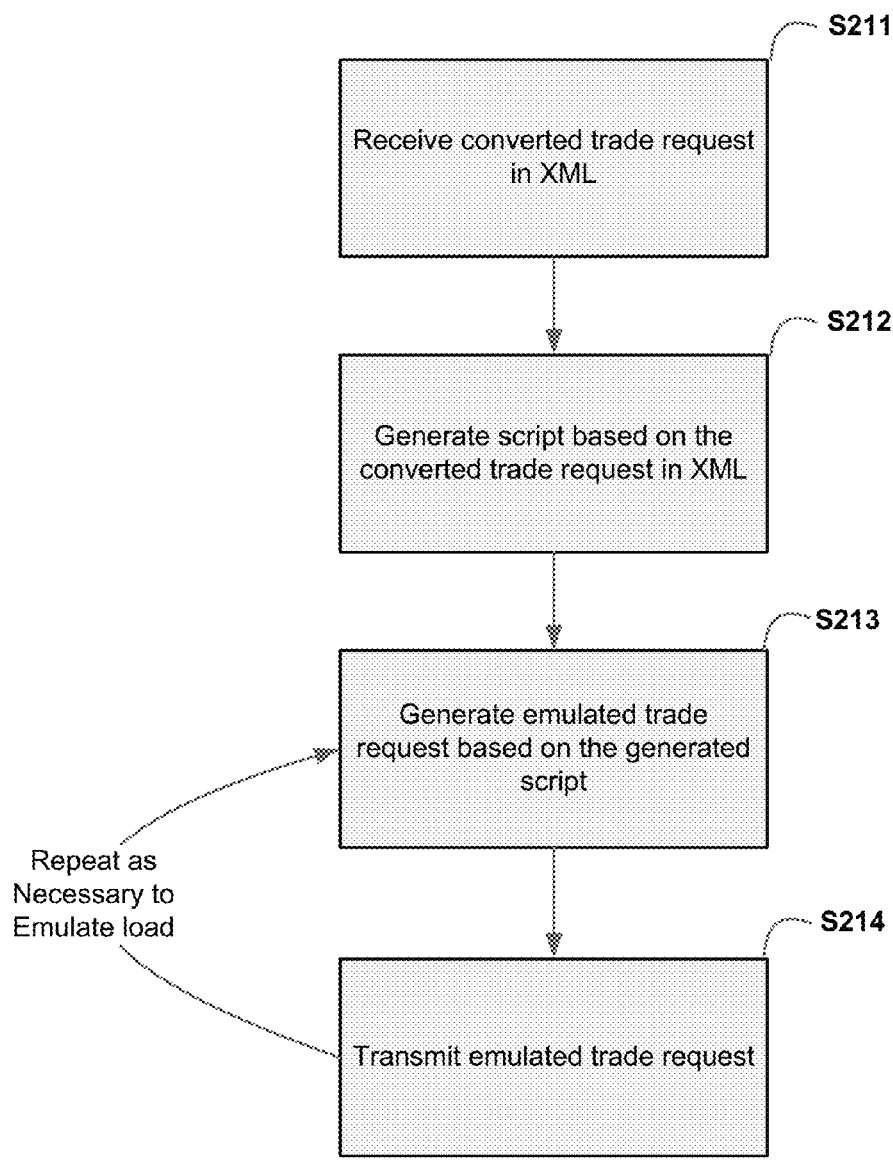
FIG. 16 is a flow chart illustrating an operation according to an exemplary embodiment of the present invention.

An exemplary operation of the load Testing Tool 1400 will now be described with relation to FIG. 16. First, the Testing Tool receives a trade request converted to a DBCommand in XML (step S211). The converted DBCommand in XML was converted by the Applet Proxy 1200 in step S202A1 (FIG. 13). Next, the Testing Tool 1200 generates a script based on the trade request converted to a DBCommand in XML (step S212). As explained above, the script is for simulating load, for example on the Backend Trading Server 1300. Next, the Testing Tool 1200 generates an emulated trade request in the form of a DBCommand in XML based on the generated script (step S213), and transmits the emulated trade request (step S214). Steps S113 & S114 may be repeated as many times as necessary to emulate the load on the server 300.

According to the general method described above, the load Testing Tool 1400 according to the exemplary embodiment is operable to send many requests messages, receive responses, and evaluate the overall performance of the system. The load Testing Tool 1400 according to the exemplary embodiment is able to evaluate performance even though the Trading Client 1100 and Backend Trading Server 1300 send binary DBCommands whereas the Load Testing Tool 1400 is only capable of evaluating applications sending messages in XML format.

Figure 17:
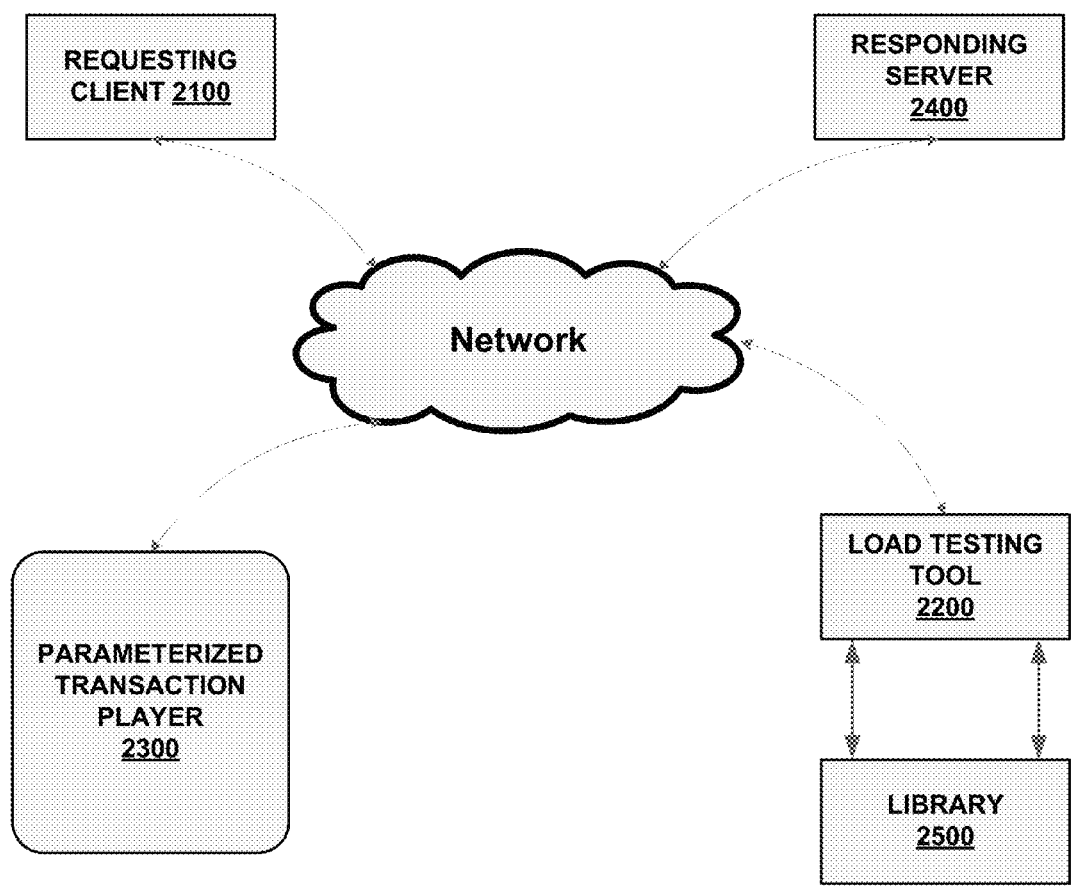
FIG. 17 is a block diagram illustrating an exemplary embodiment of the present invention.
Figure 18:
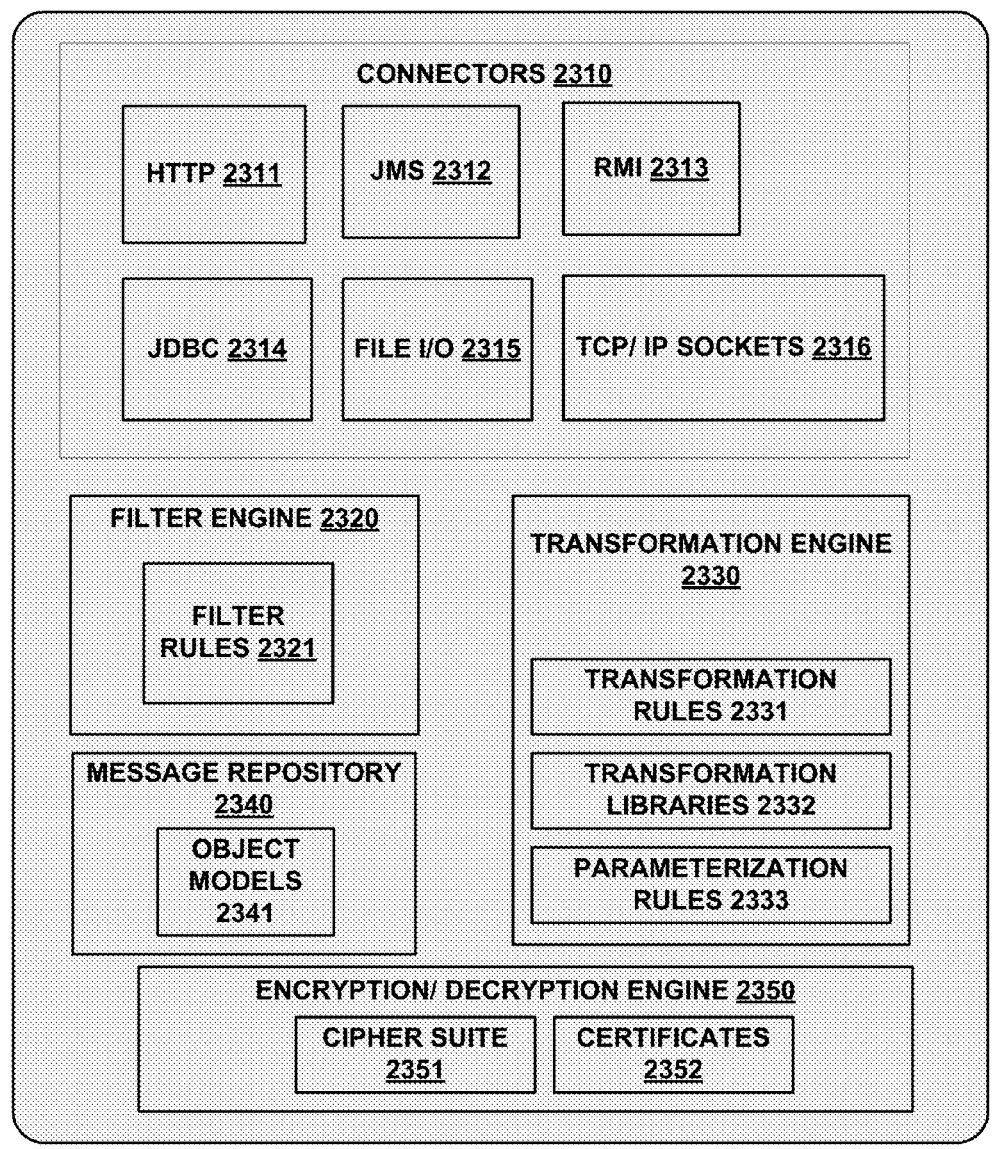
FIG. 18 is a block diagram illustrating an exemplary embodiment of the present invention.

FIGS. 17 and 18 illustrate another exemplary embodiment of the present invention. According to this exemplary embodiment, there is provided:

A Requesting Client 2100, a Load Testing Tool 2200, a Parameterized Transaction Player 2300 (i.e., the translation tool/translator in this embodiment), a Responding Server 2400, and a Library 2500.

An exemplary embodiment of the Parameterized Transaction Player 2300 will now be described with reference to FIG. 18. The Parameterized Transaction Player 2300 may include the following components: Connectors 2310, Filter Engine 2320, Message Repository 2340, Transformation Engine 2330, and Encryption/Decryption Engine 2350. Each of the above described components of the exemplary embodiment of the Parameterized Transaction Player 2300 will now be described.

The Connectors 2310 may include connectors for the following connection types: HTTP 2311 (hypertext transfer protocol), JMS 2312 (JAVA message service), RMI 2313 (remote method invocations), JDBC 2314 (JAVA database connectivity), FILE I/O 2315, and TCP/IP Sockets 2316 (transmission control protocol/internet protocol sockets or the internet protocol suite). These Connectors 2310 allow the Parameterized Transaction Player 2300 to connect to different sources for receiving and sending messages. The Connectors 2310 may be configurable components via XML depending on the transport protocol used by the client and the server.

The Filter Engine 2320 utilizes Filter Rules 2321 to allow the Parameterized Transaction Player 2300 to listen only for certain types of messages as defined by the Filter Rules 2321. The Filter Rules 2321 may be configurable, for example, by XML, depending on the functionality of the specific context in which the Parameterized Transaction Player 2300 is used.

The Transformation Engine 2330 may include Transformation Rules 2331, Transformation Libraries 2332 and Parameterization Rules 2333. The Transformation Engine 2330 transforms (i.e., converts) messages from one format to another depending on the rules defined by the Transformation Rules 2331. The Transformation Rules 2331 may depend on the message format and a mode of the Parameterized Transaction Player 2300 (e.g., playback, record). The Transformation Libraries 2332 contains functions (i.e., software functions) for implementing the Transformation Rules 2331. The Parameterization Rules 2333 are used to define parameter sets that the Load Testing Tool 2200 may vary in order to conduct a load test. Thus, the Parameterization Rules 2333 may be used during a recording phase by the Transformation Engine 2330 to determine which XML fields to populate based on the particular data sets the Load Testing Tool 2200 will vary in order to achieve a full range of testing goals.

The Transformation Rules 2331 set forth high-level rules for transforming a message from a first format into a second format. For example, if the Transformation Engine 2330 is transforming an XML message into a JAVA Object, the Transformation Engine 2330 may call the XML to JAVA Object rule, in the Transformation Rules 2331. The XML to JAVA Object rule may provide instructions for transferring data from various columns of data from the XML message to fields of a JAVA Object. Once the correct rule is selected, particular functions in the Transformation Libraries 2332 may be called in order to implement the specific rule to transform the XML message into a JAVA Object.

The Message Repository 2340 may include Object Models 2341. The Message Repository 2340 maintains Object Models 2341 that other engines may use to understand the structure of messages.

The Encryption/Decryption Engine 2350 may include Cipher Suite 2351 and Certificates 2352. The Encryption/Decryption Engine 2350 decrypts and encrypts messages. The different algorithms, codes, and digital signatures which may be used for encrypting data and message authentication may be contained in the Cipher Suite 2351. The Encryption/Decryption Engine 2350 may also include Certificates 2352, which are electronic files that bind a digital signature with a public key. Encryption/Decryption may be needed because the tested applications, servers, etc., require encryption unsupported by the Parameterized Transaction Player 2300, or even because a network over which message will travel operates under a high level of security.

An exemplary operation of the system 4, utilizing a generalized MQ/JMS to server communication, will now be described with regard to FIGS. 19-22.

Figure 19:
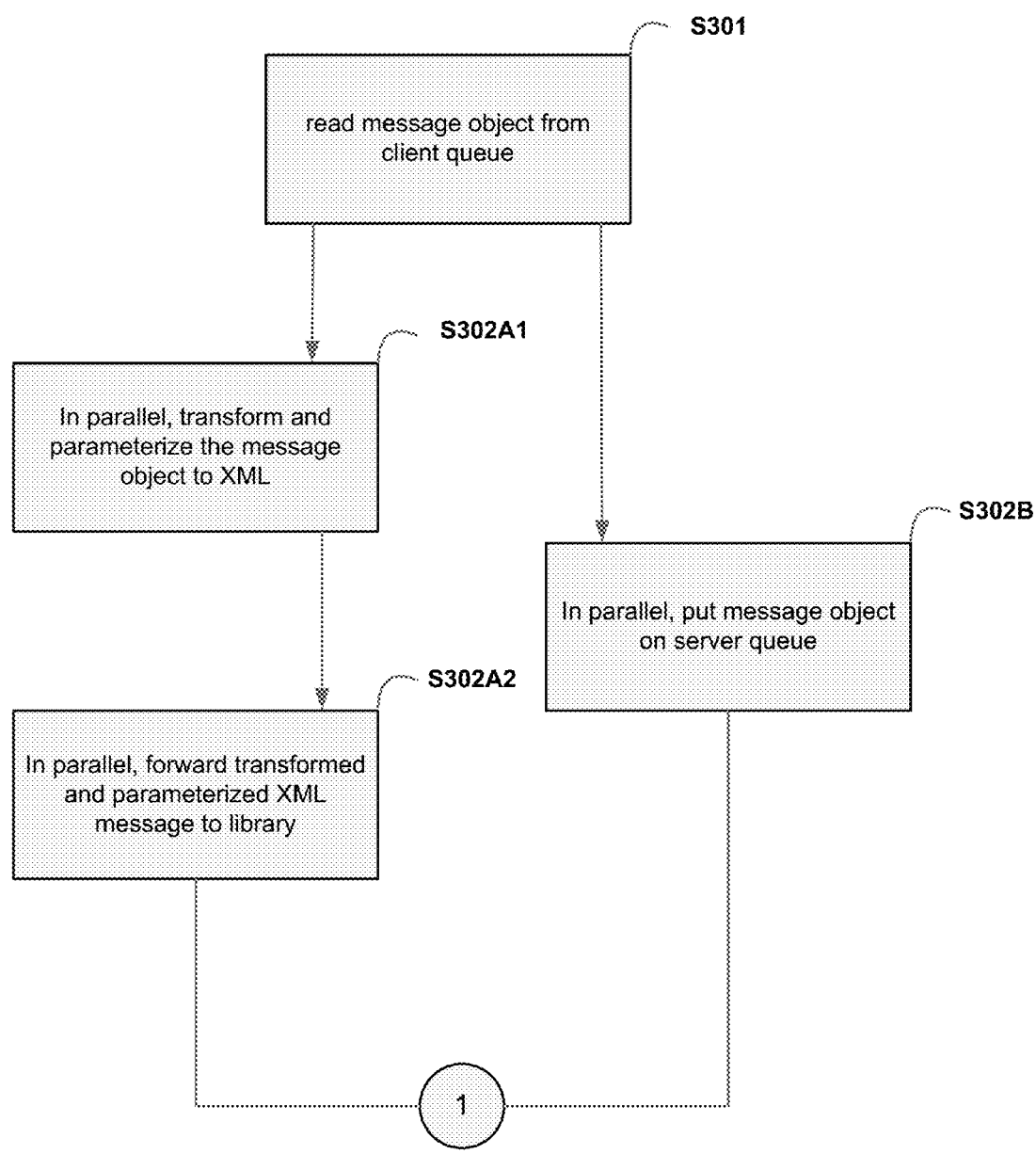
FIG. 19 is a flow chart illustrating an operation according to an exemplary embodiment of the present invention.

Starting with FIG. 19, the Parameterized Transaction Player 2300 reads a message object from a client queue (step S301) put in the client queue by the Requesting Client 2100. The Parameterized Transaction Player 2300 puts the message object on the server queue for the Responding Server 2400 (step S302B). As Parameterized Transaction Player 2300 puts the message object on the server queue for the Responding Server 2400, in parallel the Parameterized Transaction Player 2300 transforms the message object to XML (step S302A1), and forwards the XML message, to the Load Testing Tool 2200 (step S302A2). As explained above, the Parameterized Transaction Player 2300 may determine which fields of the XML message to populate based on the Parameterization Rules 2333. Forwarding the XML message to the Load Testing Tool 2200 may include storing the XML message in the Library 2500, however storing in the Library 2500 is not required.

Figure 20:
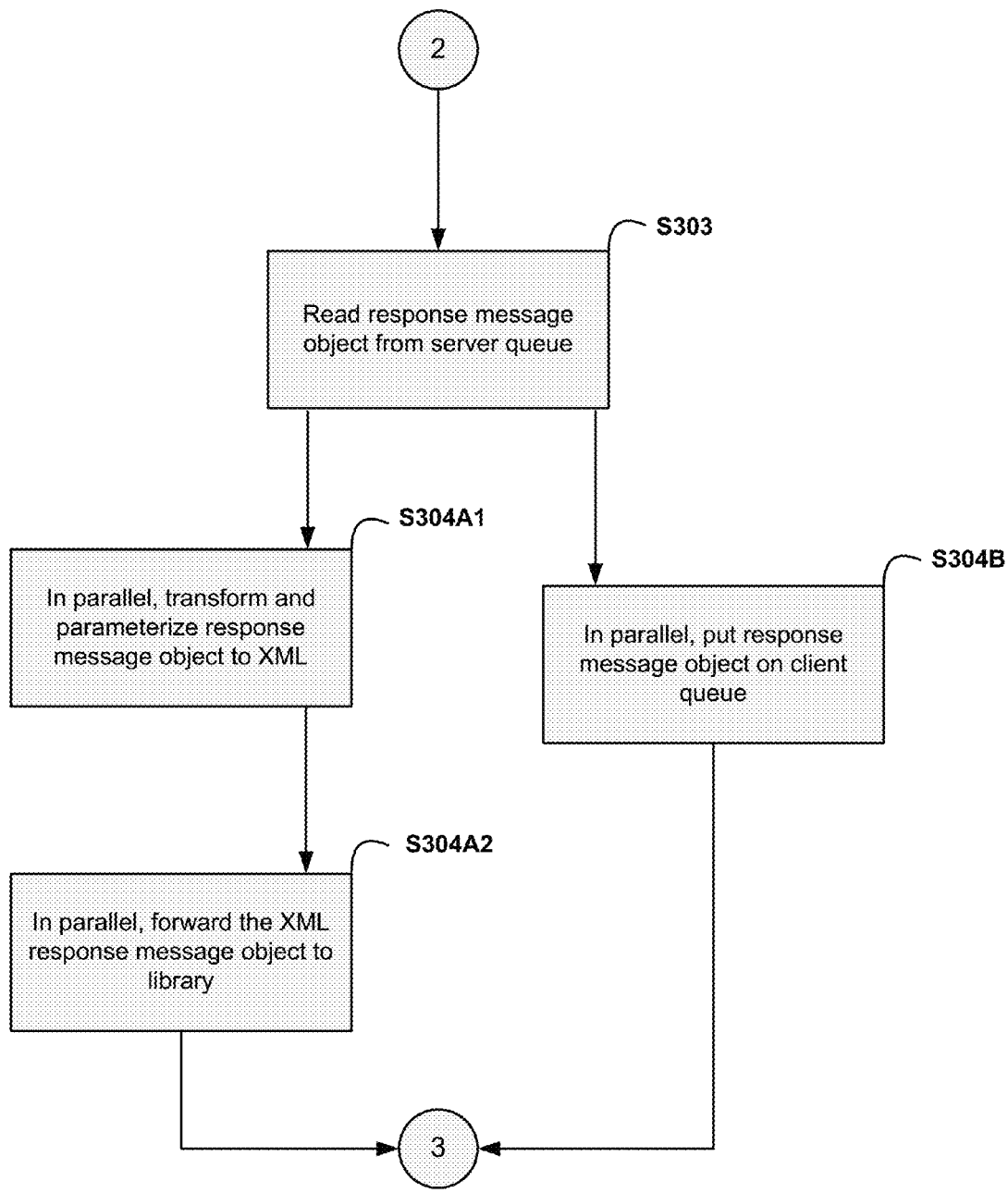
FIG. 20 is a flow chart illustrating an operation according to an exemplary embodiment of the present invention.

Turning to FIG. 20, the Parameterized Transaction Player 2300 reads a response message object from a server queue put there by the Responding Server 2400 (step S303). The Parameterized Transaction Player 2300 puts the response message object on the client queue for the Requesting Client (step S304B). As the Parameterized Transaction Player 2300 puts the response message object on the client queue, in parallel, the Parameterized Transaction Player 2300 converts response message object to XML (step S304A1), and forwards the XML response message to the Load Testing Tool 2200 (step S304A2).

The recorded response/request messages will be used in script building and playback to stress the system using the Load Testing Tool 2200. Thus, the operation described in relation to FIG. 20 is part of the so-called "recording phase", of load testing.

Figure 21:
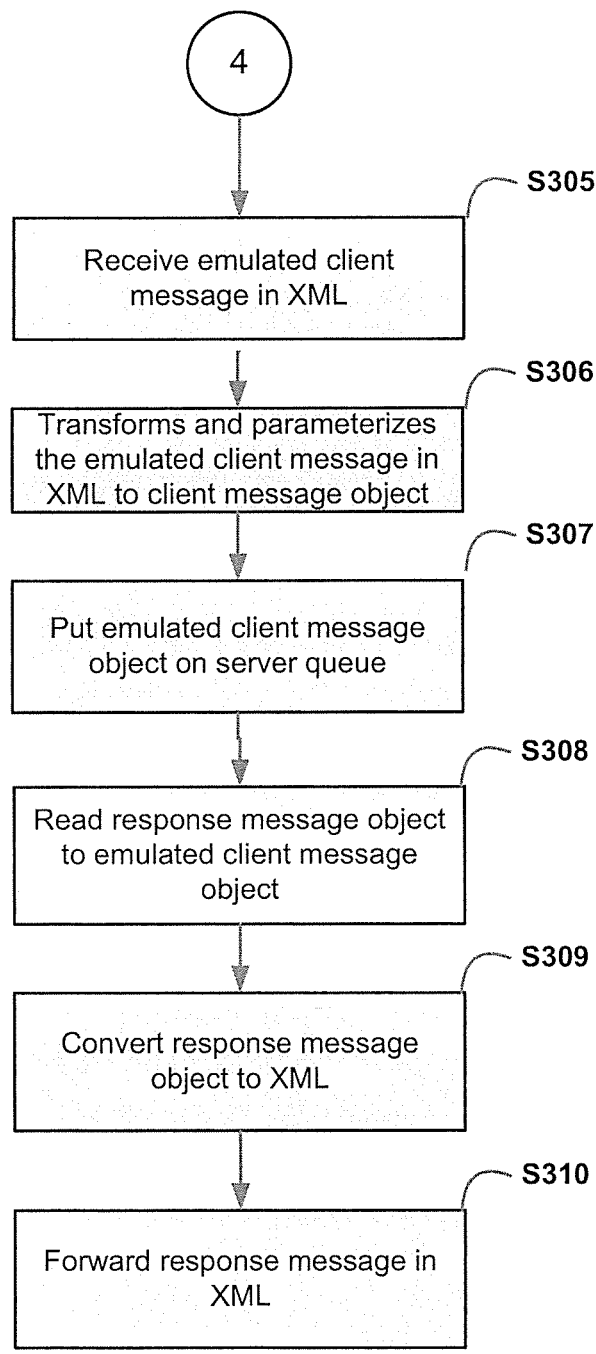
FIG. 21 is a flow chart illustrating an operation according to an exemplary embodiment of the present invention.

A further exemplary operation of the Parameterized Transaction Player 2300 will now be described in relation to FIG. 21.

The Load Testing Tool 2200 forwards an emulated message in XML, possibly stored in the Library 2500, to the Parameterized Transaction Player 2300 (step not shown). As explained above, the emulated message in XML is the message object that was transformed and parameterized to XML.

The Parameterized Transaction Player 2300 receives the emulated message (step S305). The Parameterized Transaction Player 2300 transforms the emulated client message from XML into a client message object (step S306), and puts the emulated client message object on the server queue for the Responding Server 2400 (step S307). As explained above, there are multiple ways the Parameterized Transaction Player 2300 may transform the emulated client message in XML to a client message object, for example, serializing the emulated client message in XML using XStream®.

The Parameterized Transaction Player 2300 reads a response message object on the server queue from the Responding Server 2400 (step S308). The Parameterized Transaction Player 2300 transforms the response message object to XML (step 309), and forwards the response message object to the Load Testing Tool 2200 (step S310).

Figure 22:
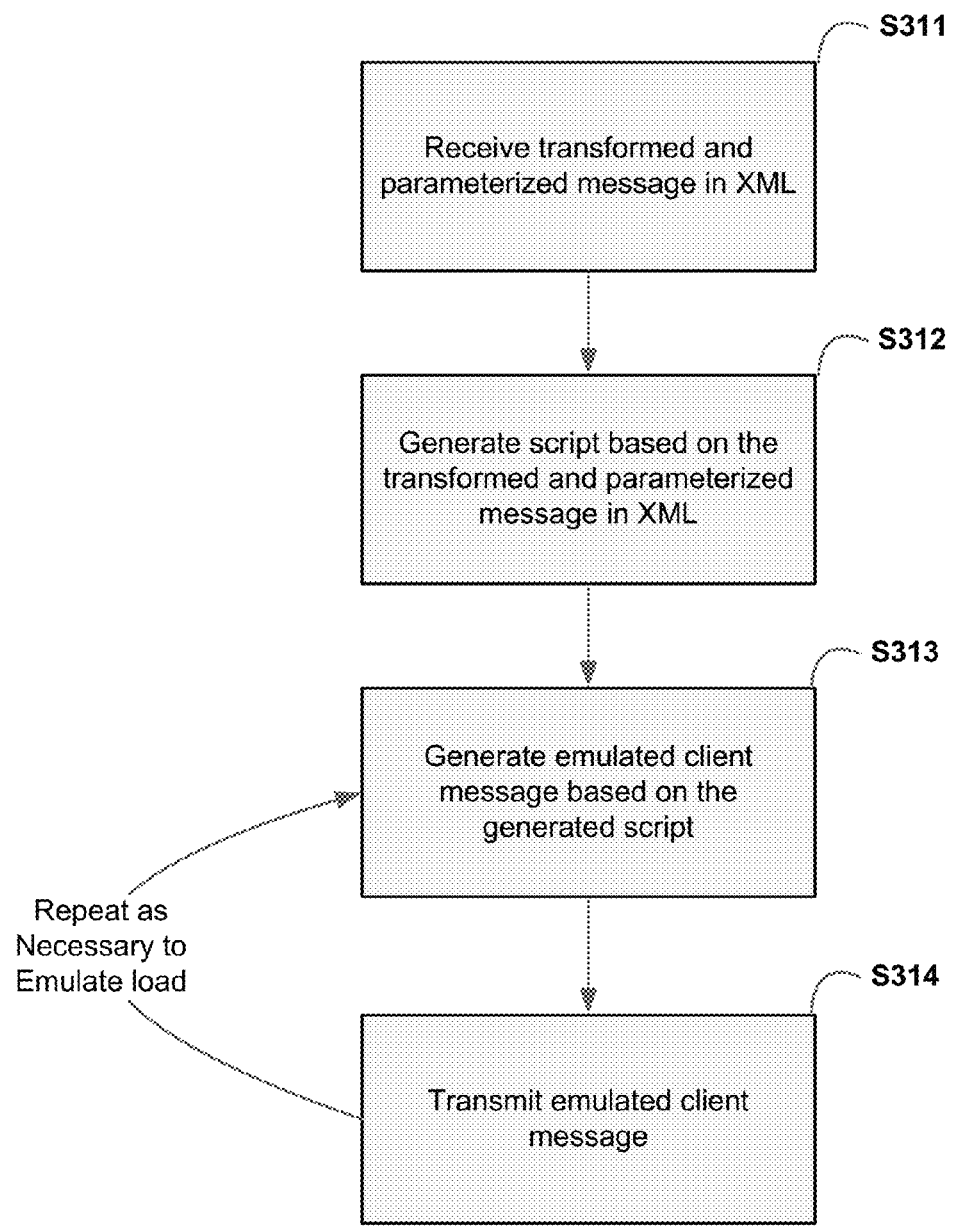
FIG. 22 is a flow chart illustrating an operation according to an exemplary embodiment of the present invention.

An exemplary operation of the Load Testing Tool 2200 will now be described with relation to FIG. 22. First, the Load Testing Tool 2200 receives a transformed and parameterized message in XML (step S311). The transformed message in XML was transformed and parameterized by Parameterized Transaction Player 2300 in step S302A1 (FIG. 19). Next, the Load Testing Tool 2200 generates a script based on the transformed message in XML (step S312). As explained above, the script is for simulating load, for example on the Responding Server 2400. Next, the Load Testing Tool 2200 generates an emulated client message in XML based on the generated script (step S313), and transmits the emulated client message (step S314). Steps S313 & S314 may be repeated as many times as necessary to emulate the load on the Responding Server 2400.

According to the general method described above, the Load Testing Tool 2200 according to the exemplary embodiments is operable to send many requests messages, receive responses, and evaluate the overall performance of the system. The Load Testing Tool 2200 according to the exemplary embodiment is able to evaluate performance even though the Requesting Client 2100 and Responding Server 2400 send message objects whereas the Load Testing Tool 2200 is only capable of evaluating applications sending messages in XML format.

Although each exemplary operation of systems 1-4 recites steps performed in a particular order, the present invention does not necessarily need to operate in that recited order. One of ordinary skill in the art would recognize many variations, including performing steps in a different order.

In each of the exemplary embodiments described above, reference is made to the Load Testing Tool according to the present invention load testing a Server. However, the present invention is equally applicable to load testing of client applications, or any application. For example, the concepts of the present invention would also be applicable to testing the Applet 600 (FIG. 7) with a load of responses from the Portal Server 800 (FIG. 7).

Further, in each of the exemplary embodiments described above, each of the load Translator Tool (FIG. 1), the Applet Proxy (FIGS. 7 & 12), and the Parameterized Transaction Player (FIG. 17) is illustrated as separate from the Client 100 (FIG. 1), Applet 600 (FIG. 7), Trading Client 1100 (FIG. 12), and Requesting Client 2100 (FIG. 17). However, this is not necessarily the case. The Translator Tool may be an application layer on the same computer running the Client, Applet, or Trading Client. Each of the Translator Tool (FIG. 1), the Applet Proxy (FIGS. 7 & 12), and the Parameterized Transaction Player (FIG. 17) is also illustrated as separate from Testing Tool (FIGS. 1, 7, 12, and 17), however, this is not necessarily the case. The Translator Tool may be an application layer on the same computer running the Testing Tool. Finally, each of the Translator Tool (FIG. 1), the Applet Proxy (FIGS. 7 & 12), and the Parameterized Transaction Player (FIG. 17) is also illustrated as separate from Server (FIG. 1), Portal Server (FIG. 7), and Backend Trading Server (FIG. 12), however, this is not necessarily the case. The Translator Tool may be an application layer on the same computer running the Server (FIG. 1), Portal Server (FIG. 7), Backend Trading Server (FIG. 12), or Responding Server (FIG. 17).

Although the exemplary embodiments described herein show the transformation of messages occurring in parallel with receiving and forwarding the transformed message, the present invention is not so limited. In other embodiments, the recorded message may be stored until it is transformed at a later time. For example, in the securities trading system example, during trading hours, messages may be recorded, then, after trading hours, the saved messages may be transformed. According to this exemplary embodiment, valuable system resources do not have to be diverted to transformation during peak trading hours.

One of ordinary skill in the art will recognize that the invention can be implemented as a testing translator that interfaces with a load tester. Alternatively, the invention can be implemented so that the translation functionality is integrated into a load tester that is effectively rendered a quasi-universal load tester. The invention is not limited to binary-to-XML translation, but can involve the translation of virtually any type of a first message format-to-second message format (and vice versa), or more broadly any time of first communications protocol-to-second communications protocol (and vice versa). According to one embodiment, the invention can be used to translate between protocols in a layered protocol structure so as to effectively "move up" and "move down" the structure.

Further, as previously described, according to another exemplary embodiment, the present invention may be used to encrypt and decrypt a message as it passes through various security zones. For example, the Translation Tool may reside in a Gateway and upgrade and downgrade encryption, digital signatures, and digital certificates on messages as they pass into and out of the network which the Gateway interfaces.

Although FIGS. 1, 7, 12 and 17 only illustrate a single Translator Tool, the invention is not so limited. There may be many Translator Tools operating in parallel or otherwise. There may be Translator Tools dedicated to each device in the system. The present invention is not limited to a single Translator Tool.

The components shown in FIGS. 1, 2, 7, 12 and 17 may be or include a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc. that perform particular tasks or implement particular abstract data types.

From the above description it should be apparent that the present invention takes many forms. In addition to what has been described, the present invention is also a method and system for generating the scripts utilized by a load testing program to evaluate the performance of an application under a load; the present invention is a method and system for interfacing a Load Testing application with a myriad of different applications with different message formats; and the present invention is a method and system for translating messages in a client/server relationship from one form into another form for load testing. One of ordinary skill in the art would recognize there are numerous other arrangements and applications then these few examples.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The Load Testing system may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

What is claimed:

1. A method of conducting a load test on a system with a translation tool, the method implemented on a computer comprising a memory and a processor, the method comprising:
   forwarding a message in a first format incompatible with a load testing tool to a server on the system;
   in parallel to forwarding the message to the server on the system, automatically converting the message in the first format incompatible with the load testing tool to a second format compatible with the load testing tool, the processor, in response to receiving the forwarded message in the first format incompatible with the load testing tool, automatically selecting, based on said first format, a conversion instruction set from a plurality of conversion instruction sets stored in the memory for converting the message according to the message format of the message, and automatically executing the selected conversion instruction set, wherein the conversion instruction set comprises executable programming instructions;
   receiving an emulated message in the second format compatible with the load testing tool;
   automatically converting the emulated message in the second format compatible with the load testing tool to the first format incompatible with the load testing tool upon receiving the emulated message in the second format compatible with the load testing tool; and
   automatically forwarding the converted emulated message in the first format to conduct the load test;
   wherein the first format is binary and the second format is an extensible-markup-language.

2. The method of conducting a load test on a system with a translation tool, the method implemented on a computer comprising a memory and a processor according to claim 1, the method further comprising:
   forwarding the converted message in the second format to the load testing tool.

3. The method of conducting a load test on a system with a translation tool, the method implemented on a computer comprising a memory and a processor according to claim 1, further comprising:
   receiving a response message in the first format incompatible with the load testing tool;
   forwarding the response message in the first format incompatible with the load testing tool;
   converting the response message in the first format incompatible with the load testing tool to the second format compatible with the load testing tool.

4. The method of conducting a load test on a system with a translation tool, the method implemented on a computer comprising a memory and a processor according to claim 1, forwarding the message in the first format incompatible with the load testing tool to a server.

5. The method of conducting a load test on a system with a translation tool, the method implemented on a computer comprising a memory and a processor according to claim 4, wherein the server is one of an application server, a portal server, and a web server.

6. The method of conducting a load test on a system with a translation tool, the method implemented on a computer comprising a memory and a processor according to claim 1, further comprising:
   receiving a response message in the first format incompatible with the load testing tool; and
   converting the response message in the first format incompatible with the load testing tool to the second format compatible with the load testing tool,
   wherein the response message is a response to the emulated message in the first format.

7. A method of load testing a device in a system with a translation tool, the method implemented on a computer comprising a memory and a processor, the method comprising:
   the processor receiving messages in a first format incompatible with the processor;
   in parallel to receiving messages in a first format incompatible with the processor, the processor receiving converted messages from the translation tool in a format compatible with the processor, wherein messages received at the translation tool are automatically converted from a first message format to a second message format according to a conversion instruction automatically selected by the processor from a plurality of conversion instructions based on the message format of the messages, the translation tool automatically converting the messages upon receiving the messages at the translation tool, wherein the conversion instructions comprises executable programming instructions;

the processor generating a script based on the converted messages;

the processor generating a load for a device based on the generated script, wherein the load is in the second message format;

transmitting the load to the translation tool to automatically convert at least a portion of the load from the second message format to the first message format according to a conversion instruction automatically selected from a plurality of conversion instructions by a processor based on the message format compatible with the device in the system and to automatically forward the converted message in the second format compatible with the device in the system to the device wherein the first format is binary and the second format is an extensible-markup-language.

8. A system for remotely load testing a server operable to receive messages from a client computer, wherein the messages are in a first format incompatible with a load testing tool, the system comprising:

a translator tool, comprising a processor and a memory, operable to:

convert messages in the first format incompatible with the load testing tool to a second format compatible with the load testing tool, wherein the processor, in response to receiving the messages in the first format incompatible with the load testing tool, automatically selects a conversion instruction set from a plurality of conversion instruction sets stored in the memory for converting the message according to the message format of the messages and automatically executes the selected conversion instruction set, wherein the conversion instruction set comprises executable programming instructions, convert a load in the second format compatible with the load testing tool to the first format, wherein the processor, in response to receiving the load in the second format, automatically selects a conversion instruction set from the plurality of conversion instruction sets according to the message format compatible with the server and automatically executes the selected conversion instruction set, wherein the conversion instruction set comprises executable programming instructions; and the load testing tool operable to generate the load in the second format to test the server, wherein the second format is incompatible with the server wherein the first format is binary and the second format is an extensible-markup-language.

9. A system for remotely load testing the server operable to receive messages from the client computer, wherein the messages are in the first format incompatible with the load testing tool according to claim 8, wherein the translator tool converts using a serialization process.

10. A system for remotely load testing the server operable to receive messages from the client computer, wherein the messages are in the first format incompatible with the load testing tool according to claim 8, wherein the translator tool is further operable to forward the message in the first format incompatible with the load testing tool.

11. A system for remotely load testing the server operable to receive messages from the client computer, wherein the messages are in the first format incompatible with the load testing tool according to claim 8, wherein the translator tool is further operable to:

receive an emulated message in the second format compatible with the load testing tool, and convert the emulated message in the second format compatible with the load testing tool to the first format incompatible with the load testing tool, wherein the processor executes second conversion instructions stored in the memory for converting the emulated message.

12. A computer-based translation tool for utilization with a load testing tool that conducts a remote load testing of a remote computing device, the translation tool comprising:

at least one non-transitory storage device storing data and instructions;

a plurality of connectors, wherein the plurality of connectors communicably connects to a plurality transport protocols;

at least one computer processor accessing the data and instructions stored at said non-transitory storage device, and executing instructions to perform steps including:

providing a filter engine, wherein the filter engine filters, using at least one processor, messages based on a type of transaction; and providing a transformation engine, wherein the transformation engine is configured to:

automatically convert, using at least one processor, messages from a format compatible with the remote computing device to a format compatible with a load tester, and automatically convert, using the at least one processor, messages from the format compatible with the load tester to the format compatible with the remote computing device;

wherein the transformation engine, upon receiving messages, automatically select a conversion protocol from a plurality of conversion protocols stored in the memory for converting the message according to the message format of the messages, wherein the conversion protocol comprises executable programming instructions;

wherein the message is converted from binary to extensible-markup-language.

13. A translation tool for utilization with a load testing tool that conducts a remote load testing of a remote computing device according to claim 12, the translation tool further comprising an encryption and decryption engine, wherein the encryption and decryption engine encrypts and decrypts the messages.

14. A translation tool for utilization with a load testing tool that conducts a remote load testing of a remote computing device according to claim 12, wherein the message conversion from a first format to a second formation by the transformation engine is based on at least one of a mode of the translation tool, the first format, and the second format.

15. A translation tool for utilization with a load testing tool that conducts a remote load testing of a remote computing device according to claim 12, wherein the transformation engine converts the message from a first format to a second format based on transformation rules.

16. A translation tool for utilization with a load testing tool that conducts a remote load testing of a remote computing device according to claim 12, wherein the transformation engine parameterizes the converted message in a second format to be compatible with the load testing tool.

17. A translation tool for utilization with a load testing tool that conducts a remote load testing of a remote computing device according to claim 12, wherein the plurality of transport protocols comprises at least one of hypertext transport protocol, JAVA message service, remote method invocation, JAVA database connectivity, file input/output, and transmission control protocol/internet protocol sockets.

\* \* \* \* \*